(12) United States Patent
Webb et al.

(10) Patent No.: US 6,281,950 B1
(45) Date of Patent: Aug. 28, 2001

(54) HIGH SPEED DIGITAL ZONE CONTROL

(75) Inventors: James R. Webb, Boulder; Ron C. Simpson, Erie, both of CO (US)

(73) Assignee: Display Laboratories, Inc., Boulder, CO (US)

( * ) Notice: Subject to any disclaimer, the term of this patent is extended or adjusted under 35 U.S.C. 154(b) by 0 days.

(21) Appl. No.: 09/034,479

(22) Filed: Mar. 4, 1998

Related U.S. Application Data

(60) Provisional application No. 60/049,669, filed on Jun. 16, 1997.

(51) Int. Cl.$^7$ .................................................. H04N 9/28

(52) U.S. Cl. .......................................... 348/807; 348/745

(58) Field of Search .................................... 348/745, 746, 348/747, 806, 807, 129, 181; H04N 9/28, 9/31

(56) References Cited

U.S. PATENT DOCUMENTS

| | | | |
|---|---|---|---|
| 3,852,640 | 12/1974 | McCarthy | 315/276 D |
| 3,995,269 | 11/1976 | Schumacher | 345/5 EM |
| 4,027,148 | 5/1977 | Rosenthal | 235/198 |

(List continued on next page.)

FOREIGN PATENT DOCUMENTS

| | | | |
|---|---|---|---|
| 0404700 | 12/1990 | (EP) . | |
| 0448267 | 9/1991 | (EP) . | |
| 0257096 | 11/1986 | (JP) . | |
| 0204594 | 2/1988 | (JP) . | |
| 0204595 | 2/1988 | (JP) . | |
| 0099376 | 9/1989 | (JP) . | |
| 4-91592 | * 3/1992 | (JP) | H04N/9/28 |
| 5-227536 | * 9/1993 | (JP) | H04N/9/28 |

OTHER PUBLICATIONS

W. Press, S. Teukolsky, W. Vetterling and B. Flannery, Numerical Recipes in C—the Art of Scientific Computing at 123–128 ($2^{nd}$ ed. 1988).

SGS Thompson Catalog of Components for Multisync Monitors.

Display Laboratories, Inc., Minicam Automated Monitor Alignment & Inspection System, 1994.

Display Laboratories, Inc., DLAB43A, Advanced Information, 1995.

(List continued on next page.)

*Primary Examiner*—David E. Harvey
(74) *Attorney, Agent, or Firm*—Merchant & Gould P.C.

(57) ABSTRACT

Disclosed is a high-speed approximation device that generates zone correction values in both the horizontal and vertical directions. Group correction values are stored for specific physical locations on the screen for each correction factor parameter. Higher resolution correction signals can be produced by generating zone correction values. Zone correction values are produced for binary fractional addresses that correspond to specific physical locations on the screen. By addressing specific binary fractional addresses that correspond to the location of the video image on the screen, new group correction values do not have to be produced each time the horizontal or vertical size or centering or frequency of the video image is changed. Additionally, by using start addresses and end addresses, zone correction values only have to be produced for the area which the video image occupies on the screen. The present invention also uses a high-speed binary fractional multiplier that multiplies a correction value by a series of binary numbers that simply shift the decimal location of the correction value to produce quotient values. Selection of the quotient values is made by a binary fractional address signal that indicates the specific address for the zone correction value to be generated. By transforming from an arbitrary line count address space to a binary physical address space, the present invention allows for the use of a simple and fast parallel binary fractional multiplier engine.

16 Claims, 19 Drawing Sheets

U.S. PATENT DOCUMENTS

| | | | |
|---|---|---|---|
| 4,058,826 | 11/1977 | Schneider | 358/10 |
| 4,401,922 | 8/1983 | Kamata et al. | 315/368 |
| 4,422,019 | 12/1983 | Meyer | 315/368 |
| 4,506,292 | 3/1985 | Newton et al. | 358/34 |
| 4,523,188 | 6/1985 | Huber | 340/734 |
| 4,649,506 | 3/1987 | Van den Heuvel | 364/607 |
| 4,654,706 | 3/1987 | Davidson et al. | 358/139 |
| 4,672,275 | 6/1987 | Ando | 315/368 |
| 4,673,847 | 6/1987 | Louie et al. | 315/368 |
| 4,680,510 | 7/1987 | Spieth et al. | 315/368 |
| 4,687,973 | 8/1987 | Holmes et al. | 315/371 |
| 4,689,526 | 8/1987 | Schweer | 315/371 |
| 4,757,239 | 7/1988 | Starkey | 315/371 |
| 4,771,334 | 9/1988 | Bolger | 358/242 |
| 4,772,948 | 9/1988 | Irvin | 358/139 |
| 4,816,908 | 3/1989 | Colineau et al. | 358/60 |
| 4,817,038 | 3/1989 | Knoll et al. | 364/413.24 |
| 4,843,284 | 6/1989 | Schmitt et al. | 315/371 |
| 4,857,998 | 8/1989 | Tsujihara et al. | 348/190 |
| 4,871,948 | 10/1989 | Nelson | 315/368 |
| 4,897,721 | 1/1990 | Young et al. | 358/139 |
| 4,952,851 | 8/1990 | Macaulay | 315/398 |
| 5,012,332 | 4/1991 | Shiomi et al. | 358/64 |
| 5,016,095 | 5/1991 | Kii | 358/64 |
| 5,020,116 | 5/1991 | Macaulay | 358/60 |
| 5,059,979 | 10/1991 | Micic et al. | 341/152 |
| 5,081,523 | 1/1992 | Frazier | 358/29 |
| 5,091,773 | 2/1992 | Fouche et al. | 358/10 |
| 5,136,398 | 8/1992 | Rodriguez-Cavazos et al. | 358/242 |
| 5,194,783 | 3/1993 | Ogino et al. | 315/368.13 |
| 5,200,815 | 4/1993 | Tsujihara et al. | 358/60 |
| 5,216,497 | 6/1993 | Tsujihara et al. | 358/65 |
| 5,216,504 | 6/1993 | Webb et al. | 358/139 |
| 5,272,421 | 12/1993 | Kimura et al. | 315/368.12 |
| 5,274,307 | 12/1993 | Christensen | 315/368.13 |
| 5,276,458 | 1/1994 | Sawdon | 345/132 |
| 5,345,280 | 9/1994 | Kimura et al. | 348/745 |
| 5,379,062 | 1/1995 | Gleim et al. | 348/184 |
| 5,382,984 | 1/1995 | Tsujihara et al. | 346/746 |
| 5,398,083 | 3/1995 | Tsujihara et al. | 348/807 |
| 5,414,330 | 5/1995 | Tsujihara et al. | 315/371 |
| 5,430,357 | 7/1995 | Ogino et al. | 315/368.13 |
| 5,432,548 | 7/1995 | Byen et al. | 348/180 |
| 5,440,340 | 8/1995 | Tsuratani et al. | 348/190 |
| 5,444,799 | 8/1995 | Hirono et al. | 382/287 |
| 5,463,427 | 10/1995 | Kawashima | 348/806 |
| 5,473,223 | 12/1995 | Murakami | 315/367 |
| 5,473,224 | 12/1995 | Tsujihara et al. | 315/368.18 |
| 5,504,521 | 4/1996 | Webb et al. | 348/180 |
| 5,506,481 | 4/1996 | Wada et al. | 315/368.12 |
| 5,510,833 | 4/1996 | Webb et al. | 348/190 |
| 5,510,851 | 4/1996 | Foley et al. | 348/658 |
| 5,532,765 | 7/1996 | Inoue et al. | 348/807 |
| 5,537,159 | 7/1996 | Suematsu et al. | 348/745 |
| 5,657,079 | 8/1997 | Thario et al. | 348/190 |

OTHER PUBLICATIONS

Display Laboratories, Inc., DLAB62A, Advanced Information, 1995.

Display Laboratories, Inc., DLAB494, Advanced Information, 1995.

Display Laboratories, Inc., DLAB520A, Advanced Information, 1995.

James R. Webb; Micro–Chip Architecture for Full Digital Control of Geometry, Convergence and Colorimetry in CRT Monitors, Jun. 1994.

Charles Chuang et al; A Non–impact High Resolution Geometry Alignment System for Monitor Production. Paper given at Society for Information Display, San Jose, California, Jun. 1994.

Society for Information Display International Symposium, Digest of Technical Papers, vol. XXV, Jun. 14–16, 1994.

CRT Display Inspection with a Solid State Camera, by Gregory A. Kern. Paper given at Society for Information Display, San Jose, California, Jun. 1994.

Firmware for a Continuous Frequency CRT Monitor, by Steven J. Lassman. Paper given at Society for Information Display, San Jose, California, Jun. 1994.

Society for Information Display, Digest of Technical Papers, Feb. 6–8, 1996.

IEEE 1988 International Conference on Consumer Electronics, Jun. 8–10, 1988.

* cited by examiner

HIGH SPEED DIGITAL ZONE CONTROL

CROSS-REFERENCE TO RELATED APPLICATIONS

This application is based upon Provisional Application No. 60/049,669 filed Jun. 16, 1997 entitled "High Speed Interpolation Engine" by James R. Webb and Ron C. Simpson.

BACKGROUND OF THE INVENTION

A. Field of Invention

The present invention pertains generally to correcting the alignment of display devices and more particularly to digital zone control for correction and alignment of multimode display devices. This is achieved by determining the mapping of correction values for physical locations on a screen display using a high speed manner of generating incremental correction values between the physically located correction values and mapping the incremental correction values to scan lines using an approximation technique.

B. Definitions

"Address Quotient Value" means the physical division number divided by the number of scan lines of an image, for vertical geometry corrections, or by the number of pixels in a scan line, for horizontal geometry corrections.

"Physical Division Number" means the total number of physical divisions over that portion of the screen on which an image appears or that portion for which an image alignment is desired.

"Binary Order of Magnitude Number" means a number selected from the series 10, 100, 1000, 10000, 100000, etc. in binary which is representative of the numbers 2, 4, 8, 16, 32, etc. in decimal. The number of physical divisions between adjacent group addresses is selected as a binary order of magnitude number.

"Binary Fractional Address" means the address or other identifying number that is associated with a physical division that does not include group address information.

"Binary Fractional Multiplication" means multiplying the difference correction value by one or more binary fractional numbers.

"Binary Fractional Number" means the value of one divided by a binary order of magnitude number.

"Correction Value" means a number or a magnitude of a correction signal.

"Correction Factor Parameter" includes various geometry and/or distortion characteristics of the cathode ray tube including horizontal size, raster rotation, vertical size, horizontal center, vertical center, pincushioning, vertical linearity, keystoning, convergence, etc., and various electron gun characteristics of the cathode ray tube including contrast, brightness, luminosity, focus, color balance, color temperature, electron gun cutoff, etc.

"Difference Correction Value" means the magnitude of the difference between two group correction values.

"Enabled Quotient Values" means the quotient values that are selected using the binary fractional address.

"End Address" means a physical location on a screen that includes a group end address and a binary fractional end address, or a start number plus a size number.

"Group Address" means the address or other identifying number that is associated with a particular group correction value.

"Group Correction Value" means a correction value for a specified physical location of a group on a screen.

"Image" means a display or raster.

"Incremental Correction Value" means the incremental amount of correction at a binary fractional address that is added to or subtracted from an adjacent group correction value to obtain a zone correction value.

"Parallel Binary Count Signal" means a series of parallel signals that each represent a decimal position of a binary number such that each signal may either have an on or off state.

"Physical Divisions" means a series of substantially equally spaced physical locations on a screen of a raster scanned display. A binary fractional number of physical divisions are selected between group addresses which may vary for different correction factor parameters. Physical divisions do not necessarily align with scan lines on the screen.

"Physical Location on a Screen" means a physical point, line or area on a display screen on which an image is displayed.

"Quotient Value" means all or a portion of an incremental correction value that is derived by dividing the difference correction value by a binary fractional number which is the equivalent of shifting the decimal position of the binary difference correction value. Quotient values are also produced by binary fractional multiplication.

"Start Address" means a physical location on a screen that includes an initial group address and an initial interpolation address, or a start number.

"Zone Address" means the address or other identifying number of a physical division that is associated with a particular zone correction value. The zone address may include a horizontal and/or vertical group address, and/or a horizontal and/or vertical binary fractional address.

"Zone Correction Value" means a correction value at a particular zone address.

C. Description of the Background

Display devices such as cathode ray tubes, projection televisions, laser image projectors, and other various types of raster scanned display devices typically require correction to alter correction parameters such as pincushioning, luminosity, convergence, keystoning, linearity, etc. Designers of cathode ray tube monitors have expended a great deal of effort in providing precisely wound deflection coils and circuitry for driving those coils with precisely shaped waveforms to minimize distortion of the various correction parameters.

More recently, digitally generated waveforms have been used to produce correction signals in an effort to more precisely control the alignment of the cathode ray tube and minimize the distortion of the various correction factor parameters. However, the generation of these correction waveforms using digital techniques requires the storage of a large amount of data in the form of correction values. As the desire for enhanced resolution of these correction waveforms increases, the storage requirements cause these systems to be less economically attractive. Additionally, certain correction factor parameters naturally require a very high resolution signal that necessitates a very large amount of correction value data. To date, it has been uneconomical to provide digitally generated correction waveforms for these correction factor parameters.

To reduce the storage requirements of the correction value data, various zone control techniques have been employed that have relied on scan line interpolation. Accordingly, correction values are calculated for various scan lines that are evenly dispersed throughout the scanned image and interpolated values are generated for scan lines between those points using various interpolation techniques. This has greatly reduced the amount of required storage. However, difficulties have been encountered in providing satisfactory interpolation devices. Typical interpolation engines use microprocessors or digital signal processors that are both expensive and normally too slow to process the interpolated correction values at the speed required to provide the interpolated data at the proper time. Hence, the many different techniques that have been proposed have generally not been implemented in a satisfactory fashion because of these limitations.

Typical interpolation engines have a preset number of correction values (group values) for any specific correction factor parameter. For example, to correct for pincushioning distortion, a typical interpolation engine may have 32 correction values corresponding to 32 different scan lines that are evenly spaced in the vertical direction. The typical approach used by interpolation engines is to divide the difference between adjacent correction values by the number of scan lines between those correction values to obtain an interpolated correction value for each scan line. A digital signal processor or microprocessor is used to perform that division process. For pincushioning corrections, it is desirable to generate these correction values for each scan line of the screen. In this manner, the interpolation engine avoids the storage of an excessive amount of data and, in theory, is able to generate the required amount of data to provide a precisely aligned image. Typical digital signal processors and microprocessors, however, are unable, in many instances, to generate these correction values fast enough to make corrections as the image is generated. This is especially true for corrections in the horizontal direction. The inability of microprocessors and digital signal processors to provide interpolated correction values fast enough is the result of the number of high-speed divisions that must be performed by these devices. These devices are not designed to perform high speed complex divisions and, as a result, are not able to provide the interpolated data as rapidly as it is needed.

Additionally, typical interpolation systems generate a full complement of interpolated correction values but may use only a portion of those values. Interpolation engines typically generate a full set of correction values from the top to the bottom of the screen, thereby covering areas where no image is present. Since only a portion of those values that are calculated are used, because the image only covers a portion of the screen, numerous calculations are made that are not necessary, which wastes valuable processing time which, in turn, limits the data that can be generated.

Further, prior implementations for generating digital correction waveforms have tied the correction waveforms to the scan lines of a specific video signal having a particular frequency, size and centering on a display screen. A change in the frequency, size and/or centering of the video image on the screen has heretofore required generation of an entirely new set of correction values which has required realignment using a vision system.

Also, since these prior implementations have tied the correction values to image scan lines, the same amount of interpolated correction data is generated for the reduced images. For example, an image that has been reduced to half of its normal size would have twice the resolution. Variations in resolution with image size results in a further waste of computing time.

SUMMARY OF THE INVENTION

The present invention overcomes the disadvantages and limitations of the prior art by providing a high speed digital control device and method that uses correction values that are mapped to a physical location on the screen. Zone correction values are generated in accordance with the present invention for physical divisions between the physically mapped group correction values. The zone control values are then mapped to the scan lines (for corrections in the vertical direction) and pixels (for corrections in the horizontal direction).

The present invention may therefore comprise a method of generating incremental correction values for correcting the alignment of a display device comprising the steps of selecting two group correction values from a plurality of group correction values, generating a difference correction value by determining the difference between the two correction values, shifting the decimal position of the difference correction value to produce a quotient value, and summing the quotient values to produce the incremental correction value.

The present invention may also comprise a system for generating a zone correction value for correcting an image at a specified physical location on a display device using a pair of adjacent group correction values comprising, a subtractor that generates a difference correction value that is representative of the difference between said pair of adjacent group correction values; a multiplier that generates an incremental correction value by multiplying said difference correction value by one or more binary fractional numbers that are representative of a binary fractional address; a summer that sums said incremental correction value with a group correction value to produce said zone correction value.

The present invention may also comprise a method of aligning an image that is displayed on a screen using zone correction values comprising the steps of, retrieving group correction values that correspond to the amount of correction required for correction factor parameters at group addresses that correspond to physical locations on the screen; determining a start address and an end address that indicate physical locations of said image on the screen; generating the zone correction values having zone addresses that are between said start address and said end address; using said zone correction values to align the image.

The present invention may also comprise a system for correcting the alignment of a raster scanned display that displays an image on a screen comprising a zone correction value generator that uses group correction values to generate zone correction values for zone addresses that correspond to specific physical locations on the screen; circuitry that maps said interpolated correction values to scan lines of the raster scanned display.

The present invention may also comprise a system for correcting the alignment of a raster scanned display that displays an image on a screen comprising a zone correction value generator that uses group correction values to generate zone correction values that correspond to specific physical locations on the screen; circuitry that maps the zone correction values to pixels of said raster scanned display.

The present invention may also comprise an address generator that uses a physical division number that is representative of the total number of physical divisions of a raster scanned display device, and a video scan line number that is representative of the total number of scan lines of said raster scanned display, to generate zone addresses that are used to generate zone correction values for correcting the alignment of a raster scanned display comprising, a divider that divides said physical division number by said video scan line number to produce an address quotient value; an adder that accumulates said address quotient value for each scan line of said raster scanned display to produce said zone address.

The advantages of the present invention are that zone correction values can be generated as they are needed in both the horizontal and vertical directions. In other words, incremental correction values can be generated, utilizing the present invention, at a rate which is as fast as the pixel rate for high frequency monitors. Additionally, since the correction values are mapped to specific physical locations on the screen, the location and size of the video image on the screen can be moved without the necessity of determining an entirely new set of correction values for the entire screen. The present invention uses the correction values for the portion of the screen on which the video image is being displayed by generating zone correction values from group correction values that are tied to specified physical locations on the screen.

The present invention uses a fixed number of correction values that are tied to fixed physical locations on the screen. Additionally, the fixed number of physical divisions between group addresses is selected such that the number (a binary order of magnitude number) is readily divisible into the difference correction values in binary format. For example, the number of physical divisions between each group address is selected so that the division can be performed by merely shifting the decimal position of the difference correction values. Stated differently, a binary fractional multiplication can be employed by multiplying the difference correction value by a binary fractional number. This significantly increases the speed at which the divisions (or multiplications) can be performed to obtain the incremental correction values.

Since the correction values are mapped to specific physical locations on the screen, the present invention is able to determine the location of the video image on the screen and generate correction values for only that portion of the screen that is being used. In this manner, the present invention uses a fixed address space for the correction values and varies the starting point at which interpolated correction values are calculated based upon the location of the image on the screen. The present invention is also capable of handling an arbitrary number of scan lines or scan frequencies since the present invention generates zone correction values for the spatially fixed physical divisions, and then maps the zone correction values to the scan lines of the image. In other words, the present invention determines the physical location of the video signal or raster on the display and generates a binary start signal at the segment closest to the physical location of the video image or raster on the screen. A binary order of magnitude number of physical divisions are selected between each group address for each correction factor parameter so that quotient values can readily be generated by shifting the decimal position of the difference correction values. The binary fractional address of the physical divisions are used to generate incremental correction values.

Additionally, by tying the correction values to physical locations on the display screen, the resolution of the image remains constant for variations of the image size. Consistent resolution is therefore achieved and unnecessary computations, that slow the alignment procedure, are eliminated.

These features of the present invention greatly reduce the cost of the implementation of high resolution correction waveforms to provide a precisely aligned image.

DETAILED DESCRIPTION OF THE PREFERRED EMBODIMENT OF THE INVENTION

Figure 1:
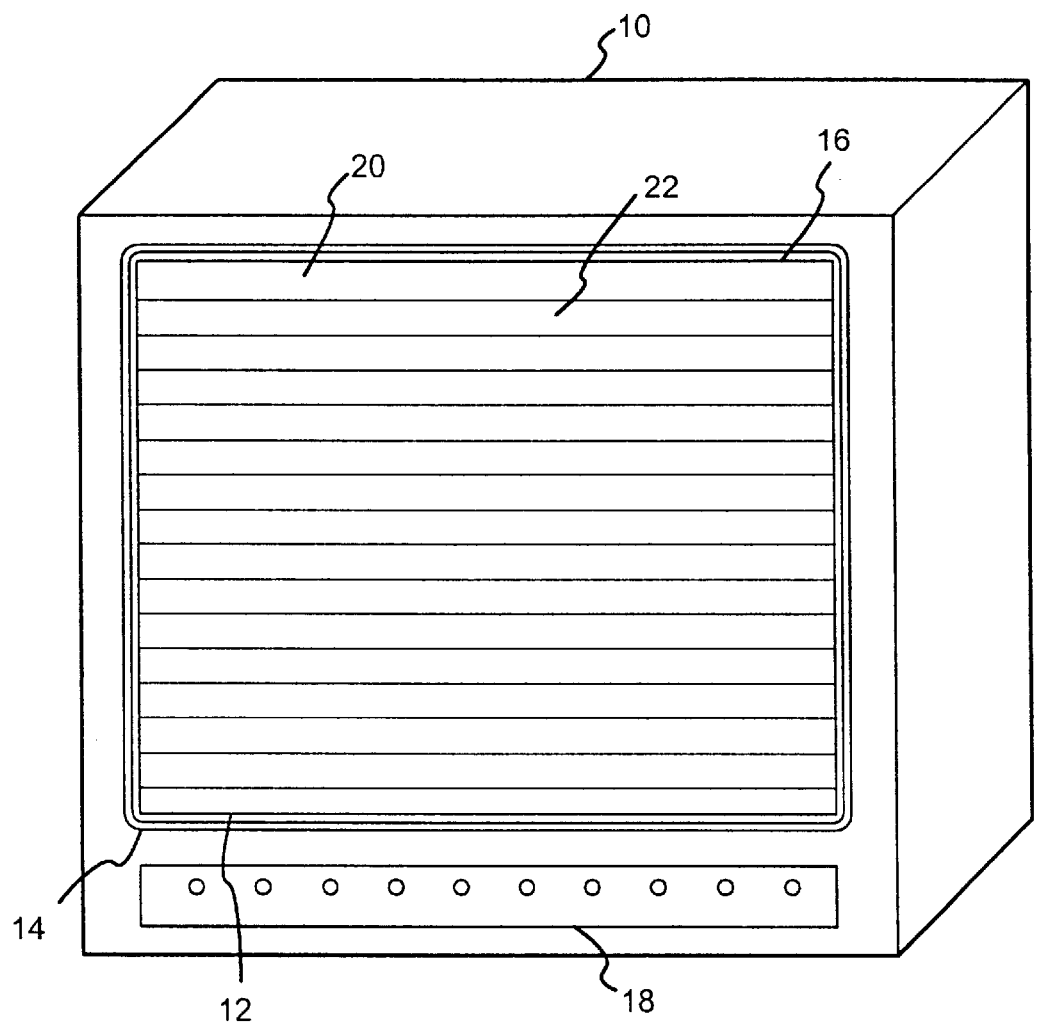
FIG. 1 is a schematic illustration of a raster scanned display device such as a cathode ray tube monitor showing the division of the display screen into a plurality of vertical groups.

FIG. 1 is a schematic illustration of a raster scanned display 10 that has a video screen 12 mounted inside a bezel 14. A video image 16 is projected onto the screen 12. User controls 18 control parameters such as the horizontal and vertical size and centering of the video image 16 on screen 12, as well as the various corrections for both horizontal and vertical geometries. As shown in FIG. 1, the video image is divided into a plurality of groups 20, 22, etc. as indicated by the horizontal lines on the video image 16. These groups, which are divided by the horizontal lines as illustrated in FIG. 1, identify specific physical locations for generating group correction values that are used for corrections in the vertical direction. The raster scanned display can comprise any one of a number of different types of displays including CRT's, projected light or laser beams, holograms, etc.

Figure 2:
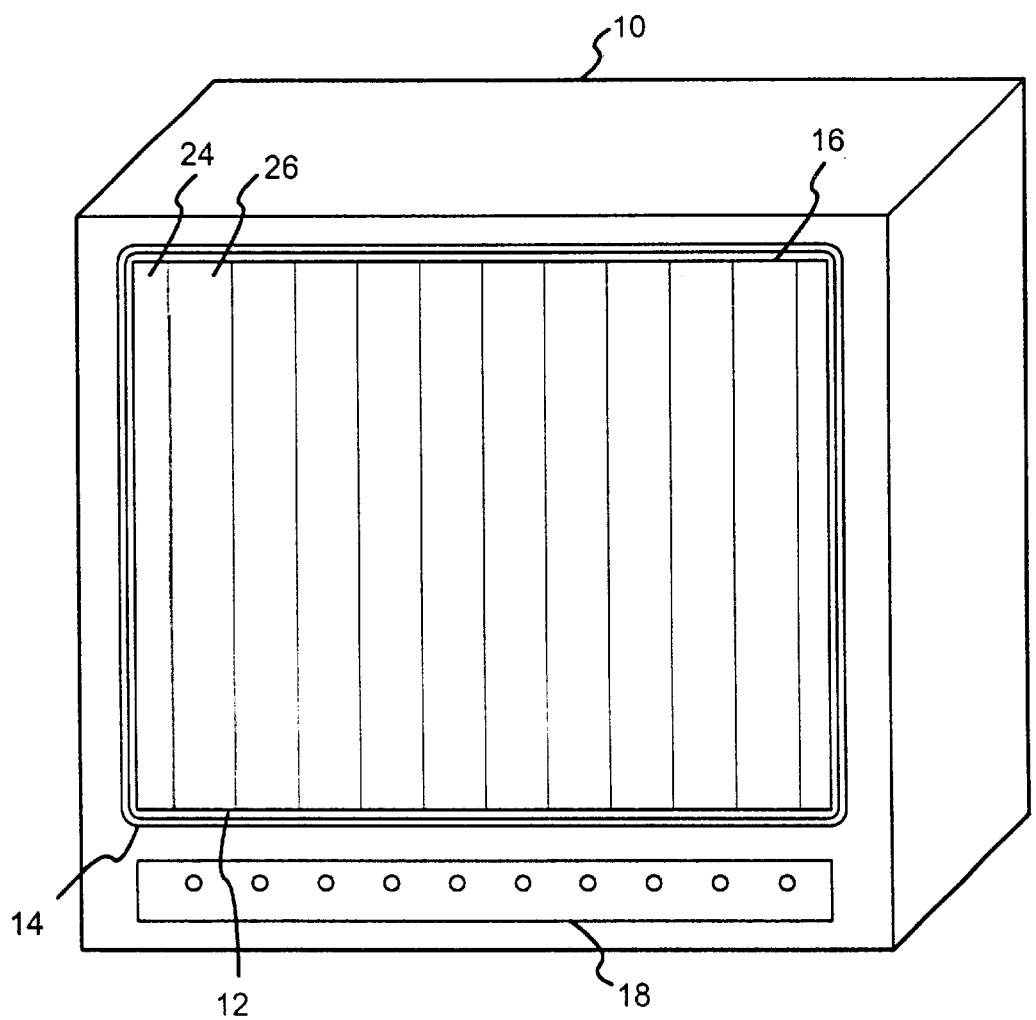
FIG. 2 is a schematic illustration of a raster scanned display device such as a cathode ray tube showing the division of the display screen into a plurality of horizontal groups.

FIG. 2 is another schematic illustration of the display device 10 having a screen 12, a bezel 14, a video image 16 and user controls 18. As shown in FIG. 2, the screen 12 is divided into a plurality of groups including group 1, illustrated by references numeral 24, group 2 illustrated by reference numeral 26, etc. These groups, which are divided by the vertical lines appearing in FIG. 2, identify specific physical locations for generating group correction values that are used for corrections in the horizontal direction. The groups illustrated in FIGS. 1 and 2 are merely illustrative and can be smaller or larger in size. In addition, group sizes can differ for different correction factor parameters.

Figure 3:
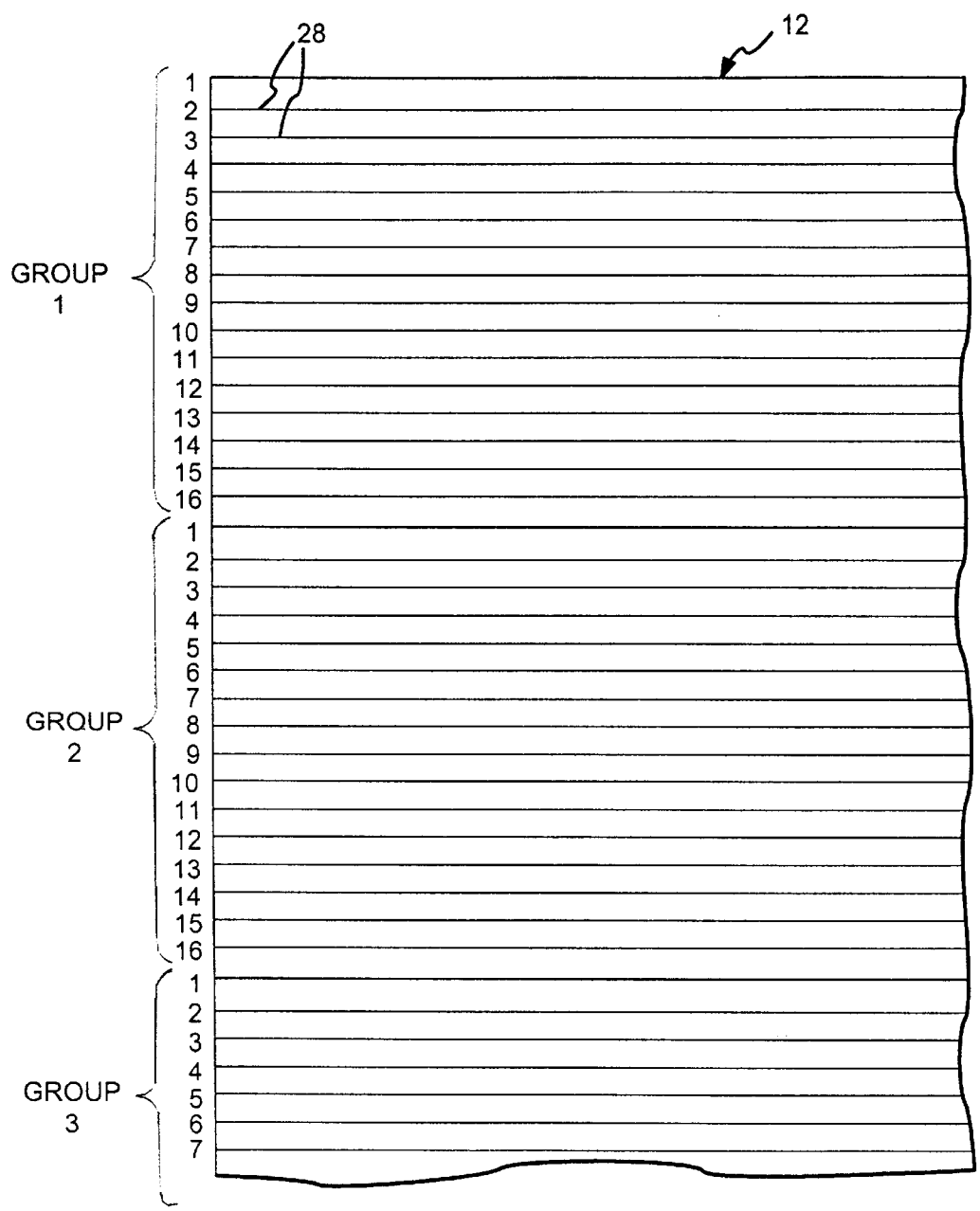
FIG. 3 is a schematic illustration of a plurality of physical divisions for a plurality of vertical groups.

FIG. 3 is a schematic depiction of a screen 12 that shows the various groups that are illustrated in FIG. 1. Each of the groups is divided into a plurality of physical divisions 28. As shown in FIG. 3, there are sixteen different physical divisions in each of the groups. The number of physical divisions constitutes a binary order of magnitude number, which means that the number of physical divisions 28 is equal to $2^x$ where x is a positive integer in decimal format. The number of physical divisions is therefore selected from the series 2, 4, 8, 16, 32, . . . etc. In binary, the number of physical divisions is selected from the series 10, 100, 1000, . . . etc. The number of physical divisions 28, of course, may be different for different correction factor parameters. For example, the number of physical divisions required for convergence may be much less than the number of physical divisions required for luminosity or pincushioning.

As also shown in FIG. 3, each of the physical divisions 28 has an actual specific physical location on the screen, as indicated by a zone address, that does not change with the size of the image that is generated on the screen. In other words, each of the groups and each of the physical divisions have specific physical locations that exist on the screen that do not change with changes that are made to the image, such as horizontal and vertical size and centering, frequency, or other geometries and parameters. As disclosed in U.S. patent application Ser. No. 08/638,222, filed Apr. 26, 1996 by James R. Webb and Ron C. Simpson, entitled "Screen Mapping of a Cathode Ray Tube" and U.S. patent application Ser. No. 08/613,902, filed Mar. 11, 1996, by Ron C. Simpson, entitled "Interpolation Engine for Generating Font Gradients," both of which are specifically incorporated by reference for all that they disclose and teach, correction values can be generated using a vision system for each of the groups. Correction values can also be manually generated or generated in any desired manner. These group correction values are then stored for each group and for each correction factor parameter. Zone correction values that have zone addresses corresponding to each of the physical divisions 28 can then be generated in accordance with the present invention. The vision system that is disclosed in U.S. Pat. No. 5,216,504, issued Jun. 1, 1993 to James R. Webb, et al., is specifically incorporated herein by reference for all that it discloses and teaches. Techniques employed in U.S. Pat. No. 5,504,521, issued Apr. 2, 1996 to James R. Webb, Stephen J. Lassman, and Ron C. Simpson, entitled "Method and Apparatus for Making Corrections in a Video Monitor During Horizontal Scan," as well as U.S. Pat. No. 5,510,833, issued Apr. 23, 1996 to James R. Webb et al., entitled "Method and Apparatus for Transforming Coordinate Systems in an Automated Video Monitor Alignment System," which are specifically incorporated herein by reference for all that they disclose and teach, may also be used in generating and processing correction values.

Figure 4:
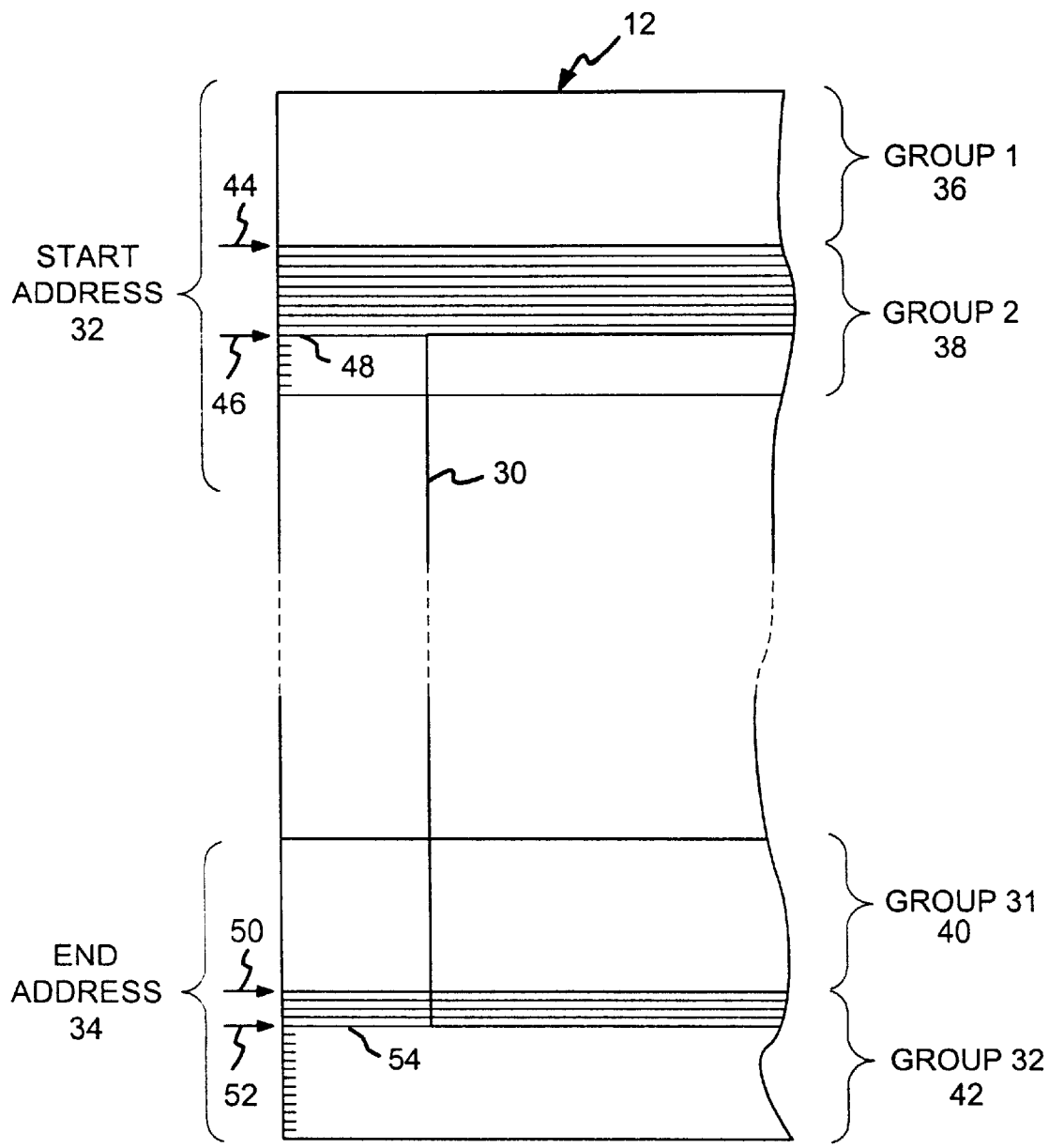
FIG. 4 is a schematic illustration of a reduced and off-center video image on a display screen showing a start address and end address.

FIG. 4 is a schematic illustration of a portion of a screen 12 showing a reduced and off-center video image 30. FIG. 4 schematically illustrates the manner in which a start address 32 and an end address 34 are determined. As indicated above, the screen 12 is divided into various physical divisions which fall within various groups for particular correction factor parameters. For example, screen 12, as illustrated in FIG. 4, may be divided into 32 vertical groups, including group 1 indicated by reference numeral 36, group 2 indicated by reference numeral 38, group 31 indicated by reference numeral 40 and group 32 indicated by reference numeral 42. In accordance with the present invention, it has been recognized by the inventors that distortion of the video image is linked to the physical dimensions of the screen 12 due to the fact that the windings of a cathode ray tube, the refraction of the glass of a cathode ray tube, the curvature of the glass and other factors that result in distortion are directly related to the physical dimensions of the screen 12 and remain substantially constant even when the video image is moved. Hence, a correction value for a specific correction factor parameter remains substantially constant at a specific physical location on the screen, regardless of the size of the video image 30. When the video image 30 is repositioned by changing its horizontal or vertical size or centering, correction data can be generated in the same manner using the subset of physical divisions that correspond to the position of the image on the screen. Additionally, the group correction values does not have to be remeasured. Rather, as illustrated in FIG. 4, the vertical location of the video image 30 is determined from the initial group address 44 and initial binary fractional address 46. As shown in FIG. 4, the start address 32 of the video image 30 has an initial group address, which is group 2, and an initial binary fractional address, which is physical division 10, indicated by reference numeral 48. Similarly, the end address 34 is determined by group end address 50 and binary fractional end address 52. The group end address 50 is group 32, and the binary fractional end address 52 is physical division 5, indicated by reference numeral 54.

As shown in FIG. 4, not only do new correction values not have to be generated because the location of the image on the screen has been changed or a new frequency used, zone correction values only need to be generated for the vertical section between the start address 32 and the end address 34. In other words, incremental correction values can be generated from the initial binary fractional address 46 and continue down to the binary fractional end address 52. Zone correction values in group 1 and zone correction values in group 2 between physical division 1 and physical division 10 need not be generated when the video image 30 only occupies the physical location on the screen that is illustrated in FIG. 4.

Figure 5:
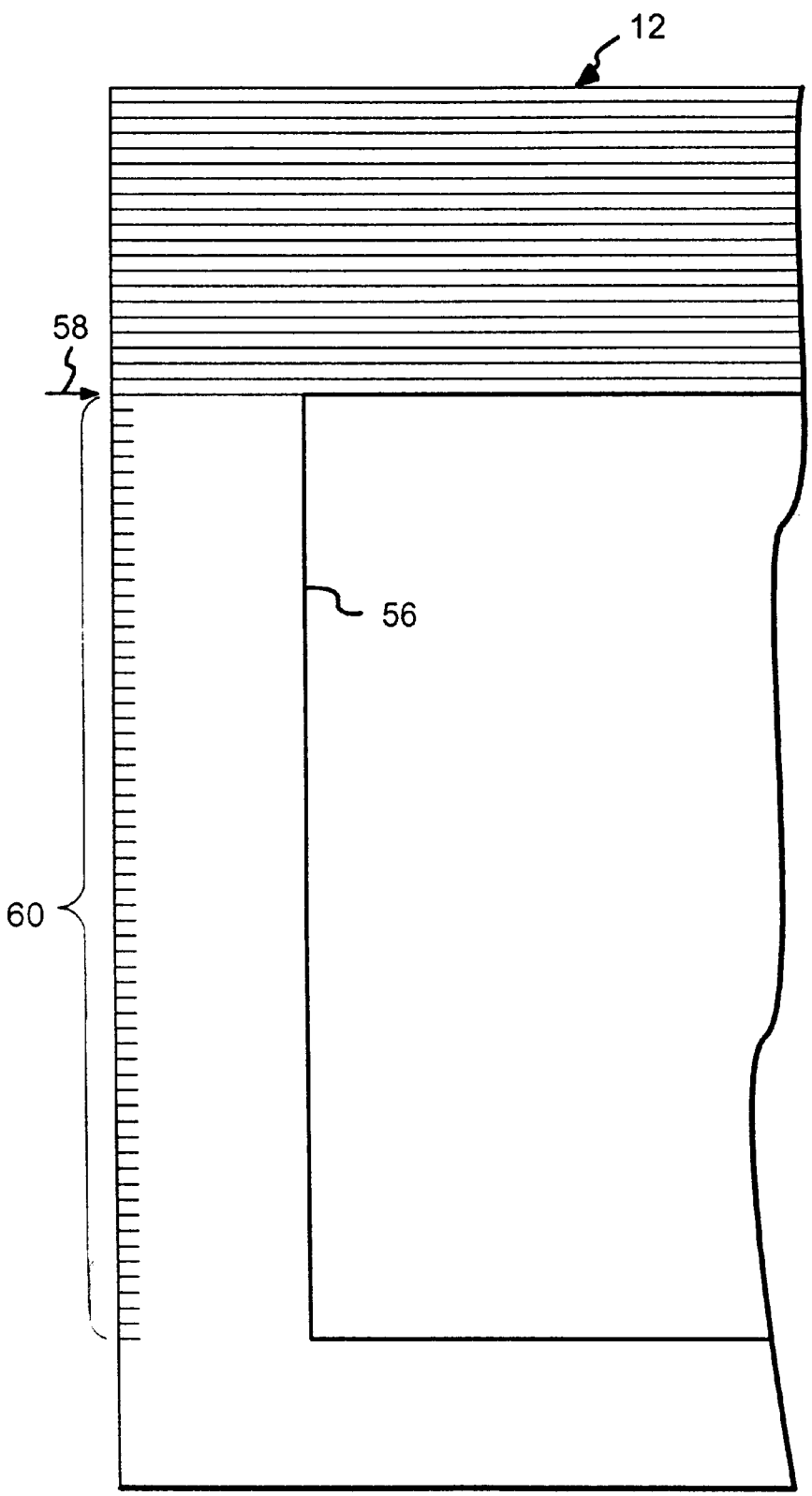
FIG. 5 is a schematic illustration of a reduced and off-center video image on a screen illustrating a start number and vertical size number.

FIG. 5 shows an alternative method of determining the beginning and end of an image on a screen. As shown in FIG. 5, the video image is off-set and made smaller than the size of the screen 12. A start number 58 can be generated by counting the number of physical divisions between the top of the screen 12 and the top of the video image 56. The vertical size 60 can then be used to calculate the bottom of the video image 56.

Figure 6:
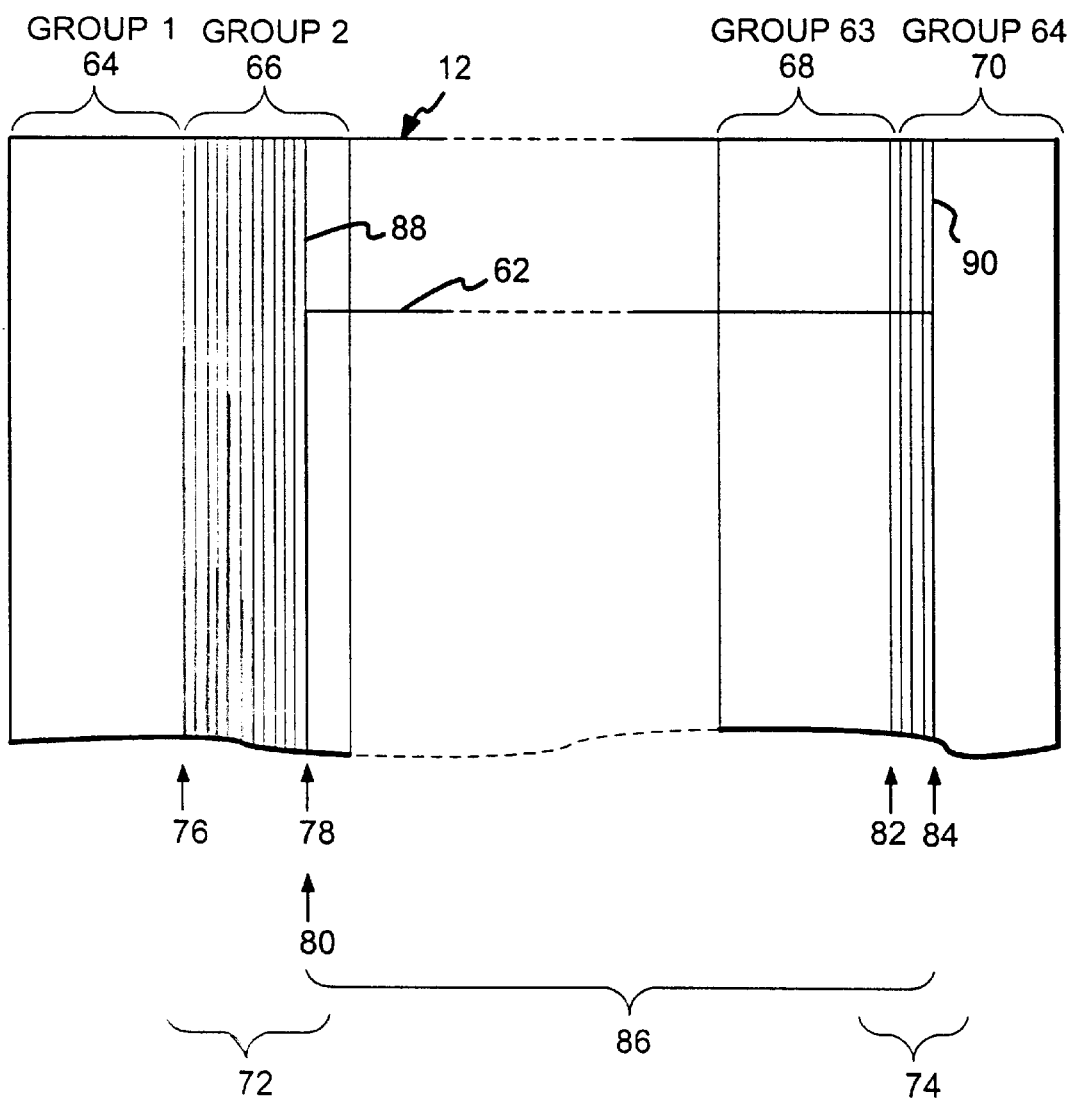
FIG. 6 is a schematic illustration of a reduced and off-center video image on a display screen illustrating start addresses and end addresses for horizontal geometry corrections.

FIG. 6 schematically illustrates the manner in which start addresses and end addresses are determined for corrections in the horizontal direction. As shown in FIG. 6, the video image 62 on screen 12 is off-center and smaller than the screen 12. The screen 12 is divided into a plurality of 64 horizontal groups. Group 1 is indicated by reference number 64, group 2 is indicated by reference numeral 66, group 63 is indicated by reference numeral 68 and group 64 is indicated by reference numeral 70. Although there are 64 groups shown in FIG. 6, any number of desired groups can be used for any particular correction factor parameter. FIG. 6 illustrates the manner in which a start address 72 and an end address 74 are generated for horizontal geometry corrections. The location of the video image 62 in the horizontal direction is determined by an initial group address 76 and an initial binary fractional address 78. The initial group address 76 and initial binary fractional address 78 comprise a start address 72. The start address 72 can also be indicated by a start number 80 which comprises the number of physical divisions between the side of the screen and beginning of the video image 62. The end address 74 can be indicated by a group end address 82 and a binary fractional end address 84. Similarly, the end address 74 can be determined by a start number 80 and a horizontal size number 86.

As shown in FIG. 6, the initial group address of the video image 62 is group 2 and the initial binary fractional address is physical division 12. Assuming that the number of physical divisions in a particular group in this example equals 16, the start number 80 for the video image is equal to 16+12= 28. Similarly, the group end address of video image 62 is group 70, while the binary fractional end address is physical division 5. The horizontal size number 86 is equal to 60×16+4+5=969. As can be seen from FIG. 6, the manner in which start address and end addresses are generated in the horizontal direction is similar to the manner in which start addresses and end addresses are generated in the vertical direction, as illustrated in FIG. 4. The video image 62 therefore extends from physical division 12, indicated by reference numeral 88 in group 2, to physical division 5, indicated by reference numeral 90 in group 64. Alternatively, video image 62 extends from physical division 28 to physical division 969.

Figure 7:
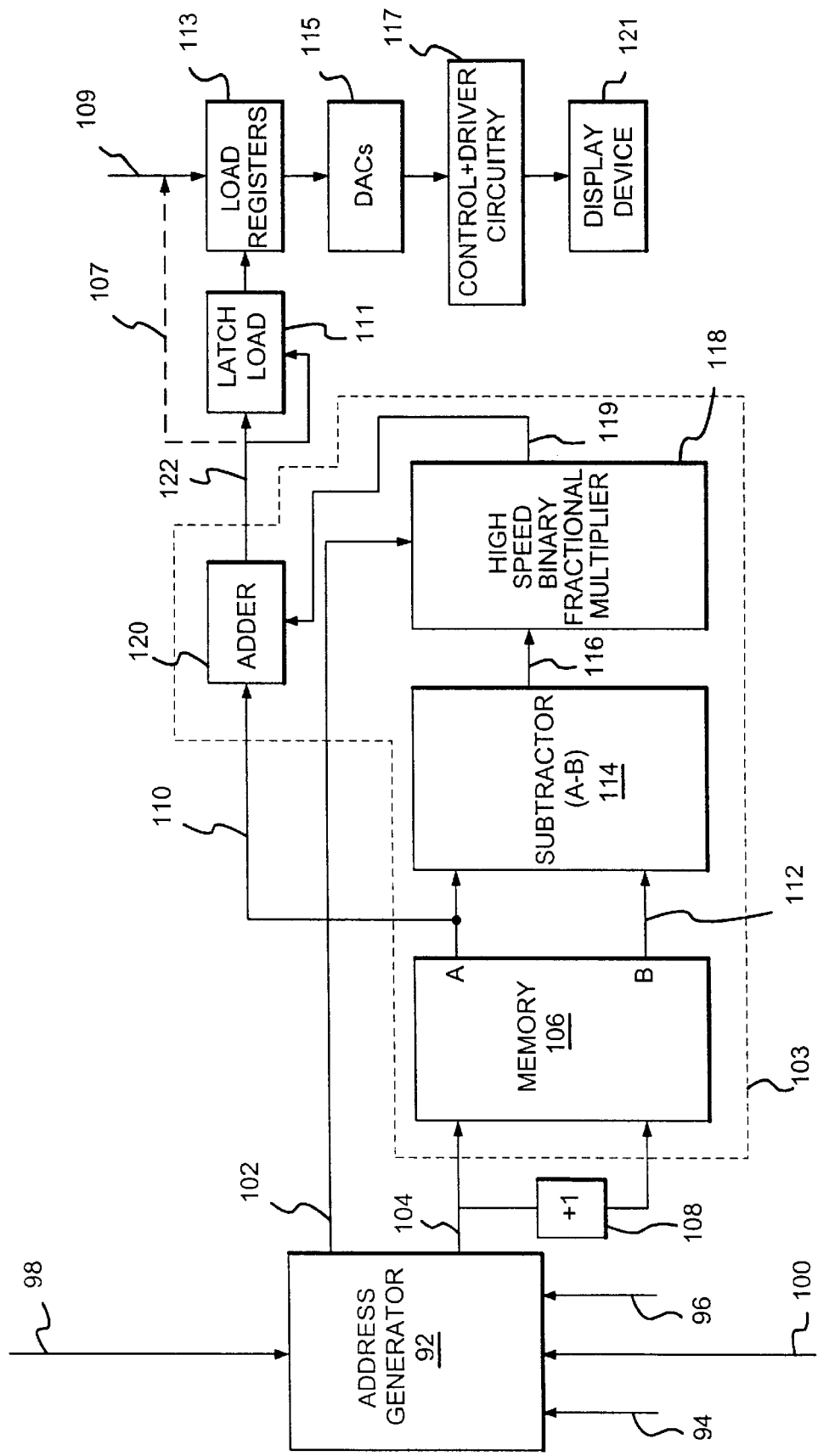
FIG. 7 is a schematic block diagram of the basic components of the present invention.

FIG. 7 is a schematic block diagram of a device for generating zone correction values and mapping the zone correction values to scan lines in accordance with the present invention. As shown in FIG. 7, an address generator 92 may use vertical sync signal 94, horizontal sync signal 96 and/or pixel clock 100, as well as user or mode table input signals 98, to generate an address signal. The mode table input signals 98 comprise data stored in a mode table that indicate the user-entered data. For example, the user may wish to change the horizontal, or vertical size, or centering of an image on the screen. The horizontal and vertical size and centering information that is input by the user is stored in the mode table and provides the necessary information for determining the start address and end address information. The mode table information can be transformed to provide corresponding zone addresses, or a start number and size number, depending upon the type of information that is required.

As also shown in FIG. 7, the address generator 92 may use the pixel clock 100 to generate address information. Pixel clock 100 may be used in certain embodiments for both horizontal and vertical geometry corrections, but is primarily used for horizontal geometry corrections.

The address generator 92, as show in FIG. 7, generates a binary fractional address 102 and a group address 104. The binary fractional address constitutes a series of least significant bits, while the group address constitutes a series of most significant bits of a sequential address signal that is generated by the address generator 92. For example, the binary fractional address 102 may comprise the four least significant bits, while the group address 104 may comprise the five most significant bits. In this example, binary fractional address 102 continuously counts to 16 and then resets. The group address then increments by one each time the binary fractional address 102 is reset.

Memory 106, disposed in the correction value generator 103, stores the group correction values for the various correction factor parameters that are used to correct distortion of the image. As mentioned previously, these group correction values may be generated by a vision system as disclosed in U.S. patent application Ser. No. 08/638,222, filed Apr. 16, 1996, by James R. Webb and Ron C. Simpson, entitled "Screen Mapping of a Cathode Ray Tube" that was incorporated by reference above. Since there are a large number of correction factor parameters, memory 106 must be sufficiently large to store all of the group correction values. The high-speed correction value generation techniques of the present invention, however, allow the memory to be maintained at a suitable size while still providing very high resolution zone correction values, since only a fraction of the total number of values need to be stored.

The group address signal 104, as also shown in FIG. 7, is also applied to adder 108 that adds one to the group address, which is, in turn, also applied to memory 106. The group address 104 and the additional group address from adder 108 are both applied to the correction value generator 103 that generates a zone correction value 122. More specifically, the group address and the adjacent group address are applied to memory 106 that produces a first output 110, that is the correction value at address A, and a second output 112, which is the correction value at address B, i.e., the next adjacent group address. Address B is the address of the correction value that is stored at the group address 104 plus one, i.e., the correction value that is stored at the address that is just subsequent to the group address 104. In this manner, adjacent group correction values are produced on outputs 110 and 112. These adjacent group correction values are applied to subtractor 114 that determines the difference between the adjacent group correction values, i.e., the difference correction value. Subtractor 114 generates the difference correction value 116, which is applied to the high-speed fractional multiplier 118. The high-speed fractional multiplier uses the binary fractional address 102 and the difference correction value 116 to generate an incremental correction value 119. The incremental correction value 119 is the incremental amount of correction at a specific physical division that is either added to the correction value at address A or subtracted from the correction value at address B to produce the zone correction value. The incremental correction value 119 that is added to or subtracted from an adjacent group correction value is a series of least significant bits that form a remainder to the group correction value. This remainder value greatly increases the resolution of the zone correction value 122.

As also shown in FIG. 7, the zone correction value 122 is transmitted to a self-resetting latch 111. Latch 111 is reset by each new zone correction value 122 that is applied to the latch 111. The latch value is then applied to registers 113, which may comprise one or more registers within the correction and driver circuitry of a display device. Registers 113 can be loaded with a horizontal sync, vertical sync, or pixel clock signal 109, an interpolation correction value 122 signal on line 107, or any other desired synchronization signal. For example, vertical sync signals may be used as the load signal when a static DAC is utilized and it is desirable to be able to reset the static DAC for each vertical scan of the raster scan display. Alternatively, it may be desirable to only reset a static DAC every M times the screen is vertically scanned. In that instance, the load signal 109 may comprise a signal that is only generated once every M times the vertical sync signal. Similarly, it may be desirable to only load registers 113 every N times the horizontal sync signal is generated, or L times the pixel clock signal is generated. In that case, the load signal 109 can comprise a signal that occurs only once every L times the pixel clock signal is generated, or once every N times the horizontal sync signal is generated. In this manner, correction values can be provided to the registers 113 in a very precise manner that corresponds to the actual physical address space of the raster scan display screen. As further illustrated in FIG. 7, the output of registers 113 are then applied to digital to analog converters 115 that convert the digital output signals of registers 113 to analog signals. The analog signals are then applied to control and driver circuitry 117 which condition the analog signals for controlling the display device 121.

In this manner, FIG. 7 illustrates the way in which correction values, corresponding to physical locations on the display device 121, can be mapped to the scan lines of the display device 121. As will be disclosed below, address generator 92 may generate address signals that are not synchronous with the scan lines of the raster scan display device 121, but rather, correspond to a physical address space on the screen. Hence, the zone correction value 122 may be generated asynchronously with the scan lines on the raster scan display device 121 and represent an actual physical location on the screen that may not correspond to any scan line. The zone correction values 122 may, therefore, be latched in latch 111 asynchronously with the scan lines and made available to registers 113 on an asynchronous basis. Registers 113, as disclosed above, can be loaded with either an H-sync signal, V-sync signal, pixel clock signal, L times pixel clock, M times H-sync, or N times V-sync 109, or alternatively can be loaded synchronously with the generation of the zone correction value 122, as shown by dotted line 107. If the registers 113 are loaded with the various H-sync or V-sync signals 109, the correction values will be available either at the beginning of horizontal lines, or at the beginning of vertical scans. If the registers 113 are loaded by way of pixel clock signal 107, correction values may be loaded in the registers 113 and made available for the display device 121 during a horizontal scan line. Of course, it may be desirable to have corrections in the vertical direction available at the beginning of a horizontal scan line, or at the beginning of a vertical scan, whereas corrections in the horizontal direction may occur one or more times during each horizontal scan line using the pixel clock (or L times the pixel clock signal). In this manner, interpolation correction values 122 may be generated as fast as several times per horizontal line so that the registers 113 may be loaded by way of load signal 107 multiple times during a single horizontal scan line to provide multiple horizontal corrections.

Figure 8:
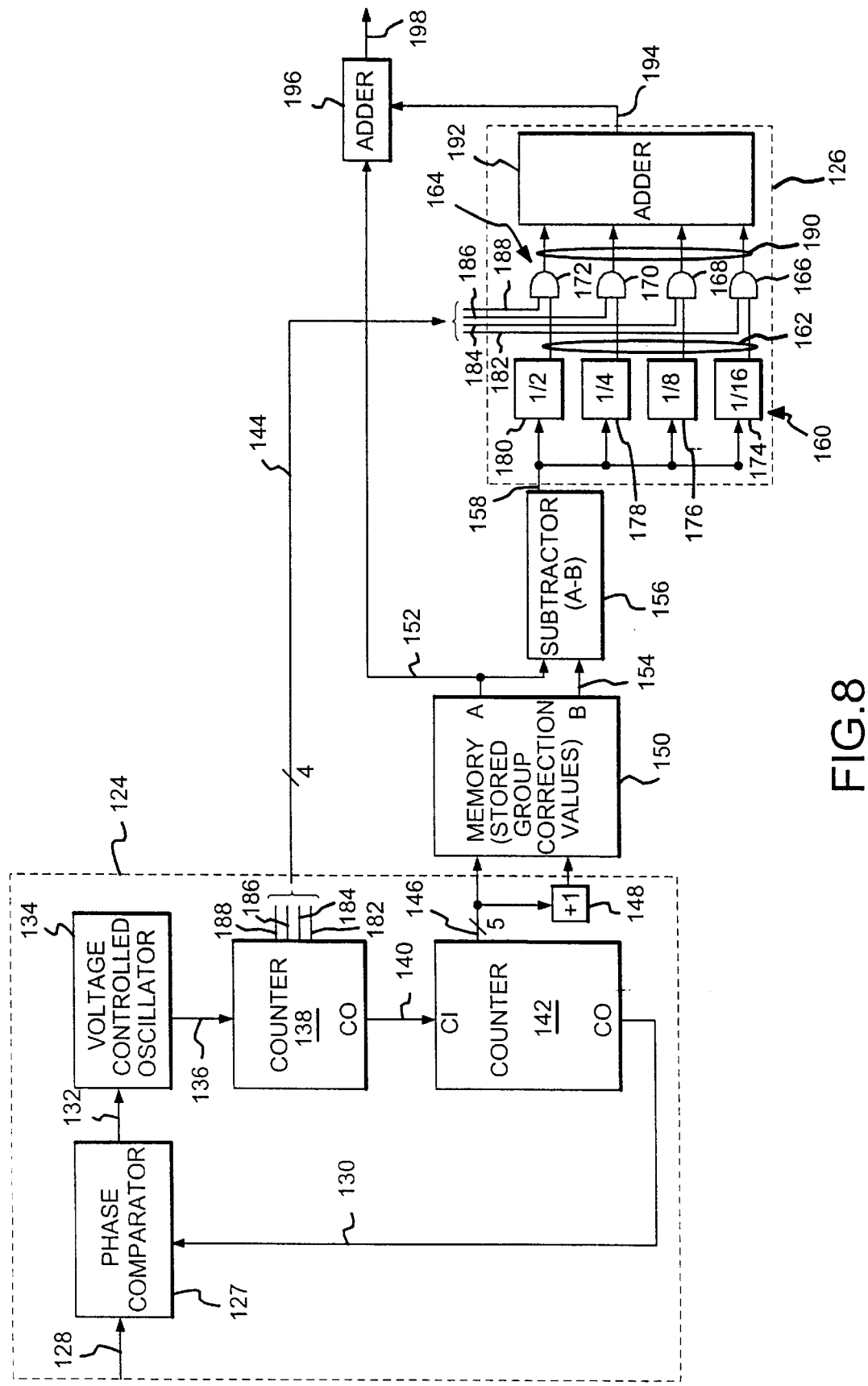
FIG. 8 is a more detailed schematic block diagram of one embodiment of the present invention.

FIG. 8 is a schematic block diagram showing a particular implementation of an address generator 124 and a more detailed block diagram of a particular implementation of a high-speed binary fractional multiplier 126. The schematic block diagram of FIG. 8 can be utilized to generate both horizontal and vertical geometry zone correction values. The address generator 124 includes a phase comparator 127 that receives either a vertical sync signal, a horizontal sync signal or a pixel clock signal from the monitor. For generating zone correction values in the vertical direction, such as illustrated in FIG. 4, input 128 to phase comparator 127 typically comprises a vertical sync signal or horizontal sync signal. To generate horizontal geometry interpolation correction values, such as illustrated in FIG. 6, input 128 to phase comparator 127 typically comprises a pixel clock signal.

The phase comparator of the address generator 124 of FIG. 8 compares the phase of the phase correction signal 130 and the input 128 and generates a difference signal 132 indicative of the phase difference between these two signals. The voltage control oscillator 134 responds to the magnitude of the phase difference signal 132 to either increase or decrease the oscillation frequency of the voltage controlled oscillator clock signal 136. It is intended that the oscillation rate of the voltage controlled oscillator 134 be adjusted such that the frequency of the clock pulse 136 matches the physical divisions. Counter 138 counts each of the clock signals 136 up to its maximum count value. In the present example, the number of physical divisions between groups is equal to 16. Therefore, counter 138 counts to 16 prior to resetting. Each time counter 138 counts to 16, a carry-out signal 140 is generated and applied to counter 142. Counter 142 counts the number of carry-out signals from counter 138 until it reaches a maximum value. For example, counter 142 in the present example can count to a value of 32. The carry-out signal 130 is generated at the output of counter 142 that constitutes the phase correction signal. The carry-out signal 130 is generated each time the number of clock pulses 136 is equal to 16×32=512. In this manner, 512 equal physical divisions will be generated either vertically down or horizontally across the screen for each vertical sync signal or horizontal sync signal, respectively. The output of counter 138 comprises a binary fractional address signal 144. The output of counter 142 comprises a group address signal 146. In other words, counter 138 continuously counts to a value of 16, which constitutes the binary fractional address 144, while counter 142 counts each time the counter 138 reaches 16, which constitutes the group address 146.

As also shown in FIG. 8, adder 148 adds one to the value of the group address 146 so that memory 150 generates correction values at adjacent group addresses. The correction value at address A is generated at output 152, while the correction value at address B is generated at output 154. The correction value at address A and the correction value address B are both applied to a subtractor 156 that generates a difference correction value 158 that is equal to the difference between the correction value at address A and the correction value at address B.

FIG. 8 also discloses a particular implementation of a high speed binary fractional multiplier 126. As shown in FIG. 8, the difference correction value 158 is applied to the high-speed binary fractional multiplier 126. The series of parallel binary fractional multipliers 160 receive the difference correction value 158 in parallel and divide the difference correction value 158 by a series of binary order of magnitude numbers, with the highest binary order of magnitude number in the series being equal to the number of physical divisions between groups. Stated differently, the parallel binary fractional miultipliers multiply the difference correction value 158 by a series of binary fractional numbers with the lowest binary fractional number in the series having a denominator equal to the number of physical divisions between groups. Since the parallel binary fractional multipliers each multiply by a binary fractional number having a binary order of magnitude number in the denominator, the operation is accomplished by merely shifting the decimal location of the binary difference correction value 158. For example, the parallel fractional multiplier 174 that multiplies by one sixteenth merely shifts the decimal location of the binary difference correction value 158 by four decimal locations to the left. Similarly, the multiply by one eighth multiplier 176 shifts the decimal location by three spaces. The multiply by one fourth multiplier 178 shifts the decimal location to the left by two spaces, while the multiply by one half multiplier 180 shifts the decimal location to the left by one space. Since this operation can be performed at a high rate of speed, the parallel division can be accomplished fast enough to generate quotient vases 162 in both the horizontal and vertical directions as they are needed. The output of the parallel binary fractional multipliers 160 comprise quotient values 162. The quotient values 162 are applied to logic devices 164 that comprise AND gates. The binary fractional address signal 144 comprises a four bit parallel binary count signal. In other words, in order to generate a binary fractional address of up to 16, four parallel lines are used so that each line can be in an on or off state to indicate the binary fractional address.

In operation, the high speed binary fractional multiplier 126 of FIG. 8 functions in the following manner. The least significant bit 182 generated by counter 138 is applied to AND gate 166. The next least significant bit 184 is applied to AND gate 168 and so on for outputs 186 and 188 and AND gates 170 and 172, respectively. When counter 138 counts the first clock pulse 136 it generates an output of least significant bit output 182. Output 182 is coupled to AND gate 166 to enable the quotient value generated by the parallel binary fractional multiplier 174 that multiplies the difference correction value 158 by one sixteenth, which is accomplished by moving the decimal location of the difference correction value four spaces to the left. This produces a quotient value that is one sixteenth of the difference correction value. In this manner, one sixteenth of the value of the difference correction value 158 is enabled which corresponds to the amount of correction required for the first physical division which is located at the first binary fractional address. The first binary fractional address is located one sixteenth of the way between the correction value at address A and the correction value at address B. When counter 138 counts the second clock pulse 136 it generates an output on line 184 only. Output 184 is coupled to AND gate 168 that enables the quotient value generated by the parallel binary fractional multiplier 176. Binary multiplier 176 multiplies the difference correction value 158 by one eighth. In this manner, the enabled quotient value 190 that is produced at the output of AND gate 168 is one eighth of the difference between the correction value at address A and the correction value at address B. In other words, the enabled quotient value at the output of 168 is two sixteenths of the difference between the correction value at address A and the correction value at address B, which is equal to two physical divisions. When counter 138 counts the third clock pulse from clock 136, an output is generated on both output 182 and output 184. AND gate 166 and AND gate 168 are enabled by outputs 182 and 184, respectively, from counter 138 to enable the quotient values generated by both of the parallel binary fractional multipliers 174 and 176 that multiply the difference correction value 158 by one sixteenth and one eighth. These enabled quotient values 190 are added in adder 192 to create an incremental correction value 194 that is equal to three sixteenths of difference between the correction value at address A and the correction value at address B, which is equal to the correction required at three physical divisions down from group address A. This continues on until each of the sixteenth values is sychronously generated as incremental correction values 194. In this manner, the binary fractional address 144 functions as an enable signal to enable the proper quotient values for each successive binary fractional address 144.

Referring again to FIG. 8, the incremental correction value 194 is added to the correction value 152 at address A by adder 196 to generate the zone correction value 198. Although FIG. 8 shows a specific layout of a high-speed binary fractional multiplier 126 using AND gates as logic devices 164, the binary fractional address can directly enable the parallel binary fractional multipliers 160, if desired, as further disclosed in FIG. 12. Alternatively, the incremental correction value 194 could be subtracted from the correction value 154 at address B. Additionally, any of the functions shown in the block diagrams of FIG. 8 can be performed in program code in a processor or state machine using conventional programming techniques.

Figure 9:
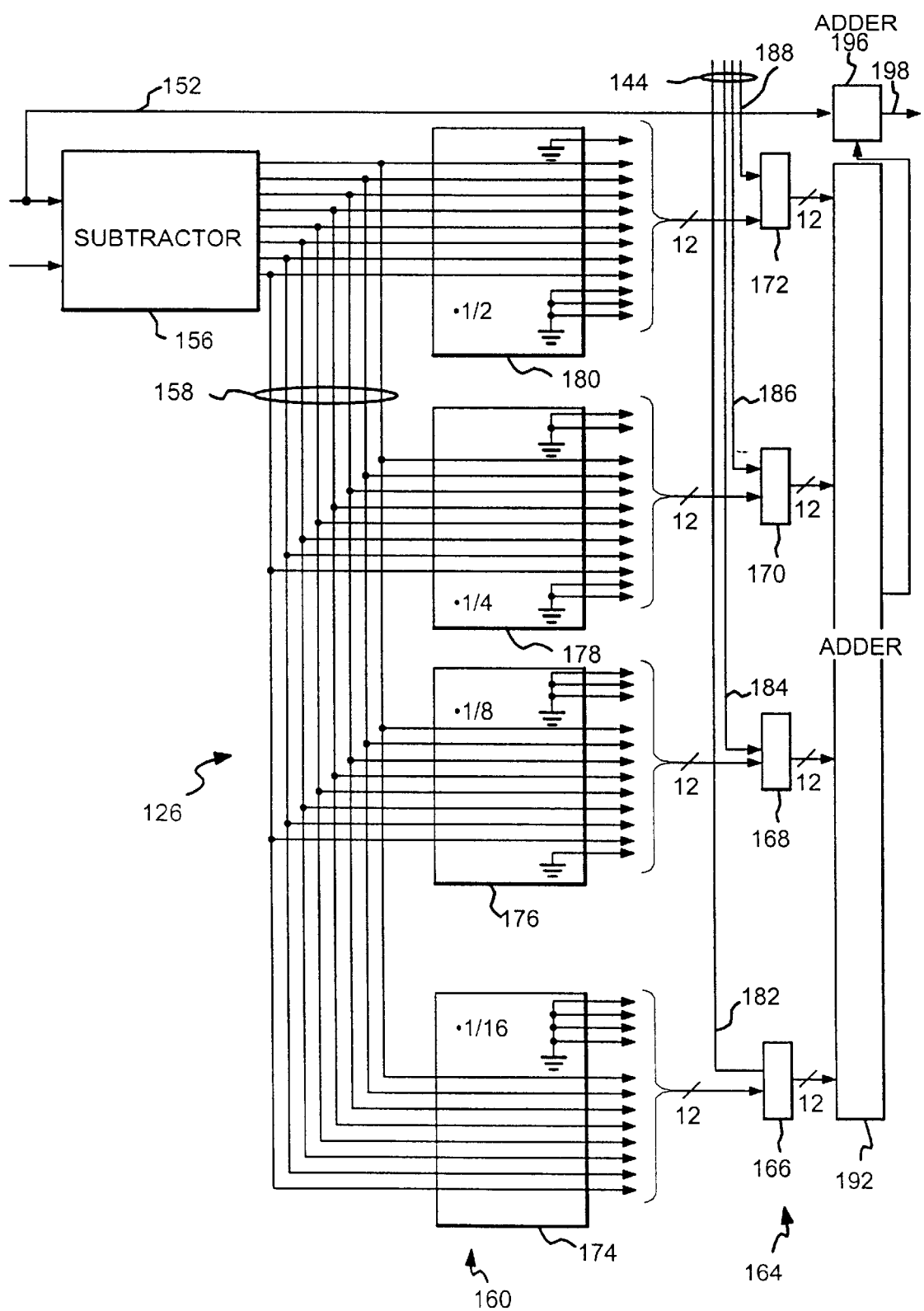
FIG. 9 is a block diagram illustrating one embodiment of the high speed binary fractional multiplier.

FIG. 9 is a more detailed schematic block diagram of the high speed binary fractional multiplier 126. As shown in FIG. 9, subtractor 156 provides the difference correction value 158 which may comprise a binary signal on the eight output lines from subtractor 156. Since the difference correction value 158 is an eight bit binary signal, 256 different values can exist for the difference correction value 158. Each of these eight bits is applied to the parallel binary fractional multipliers 160 which comprise multipliers 174, 176, 178, 180. The parallel binary fractional multipliers 160 convert the eight bit difference correction signal 158 into a 12 bit signal. Parallel binary fractional multiplier 174 multiplies the eight bit signal by one sixteenth by shifting the eight bit binary difference correction signal 158 to the eight most least significant bits of the 12 bit signal. As shown in FIG. 9, this is accomplished by providing four bits that are the most significant bits to form the 12 bit output signal. These four bits are tied to ground. In a similar manner, parallel binary fractional multiplier 176 multiplies the difference correction value 158 by one eighth. This is accomplished by forming a 12 bit output signal in which the three most significant bits and the least significant bit are provided by the parallel binary fractional multiplier 176. In other words, the eight bit binary difference correction value signal 158 is shifted by three decimal positions to achieve a binary division of one eighth. In a similar manner, parallel binary fractional multiplier 178 shifts the eight bit difference correction value 158 by two decimal positions to achieve a multiplication by one-fourth, while parallel binary fractional multiplier 180 shifts the difference correction value signal 158 by one decimal position to achieve a binary fractional multiplication of one-half. The 12 bit binary signals at the output of the parallel binary fractional multipliers 160 are applied to logic devices 164 which comprise AND gates 166, 168, 170 and 172. The binary fractional address 144 comprises input 188 which is the most significant bit, input 186 which is the next to the most significant bit, input 184 which is next to the least significant bit and input 182 which is the least significant bit. The binary fractional address 144 is applied to the various AND gates 172, 170, 168 and 166. The binary fractional address signal 144 is used as an input to the logic devices 164 to enable these logic devices. The output of the logic devices 164, which is a 12 bit binary signal, is applied to adder 192 that adds the enabled 12 bit quotient values. The output of the adder 192 is then applied to adder 196 that adds the incremental correction values to the correction value at address A 152 to produce an output 198.

Figure 10:
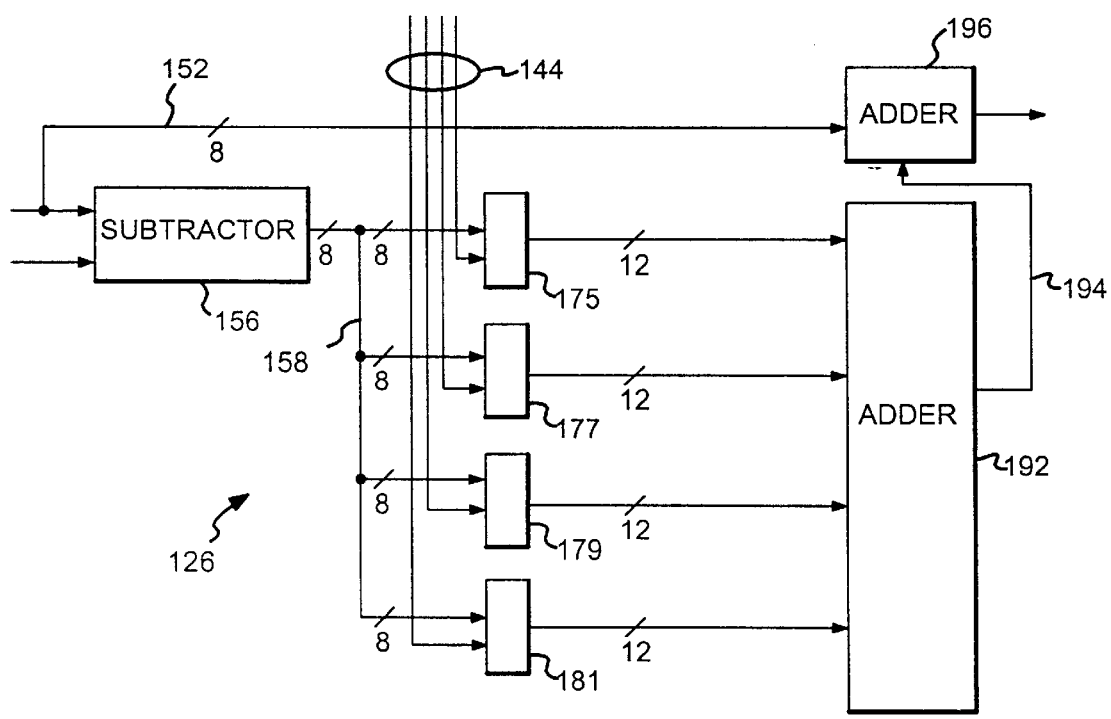
FIG. 10 is a block diagram illustrating another embodiment of the high speed binary fractional multiplier.

FIG. 10 is a schematic block diagram illustrating an alternative embodiment of the high speed binary fractional multiplier 126. As shown in FIG. 10, the subtractor 156 generates an eight bit binary difference correction value signal that is applied to AND gates 175, 177, 179 and 181. These AND gates are also coupled to the binary fractional address signal 144 that are used to enable the AND gates. The AND gates function as the logic devices for enabling the eight bit binary difference correction signal and also shift the decimal position of the eight bit binary difference correction signal to perform a binary fractional multiplication. The 12 bit output signals from the AND gates are then applied to an adder 192 that adds the enabled quotient values. The output of adder 192 is applied to adder 196 via connector 194. Adder 196 adds the incremental correction value 194 with the correction value at address A 152 in the manner described above.

Figure 11:
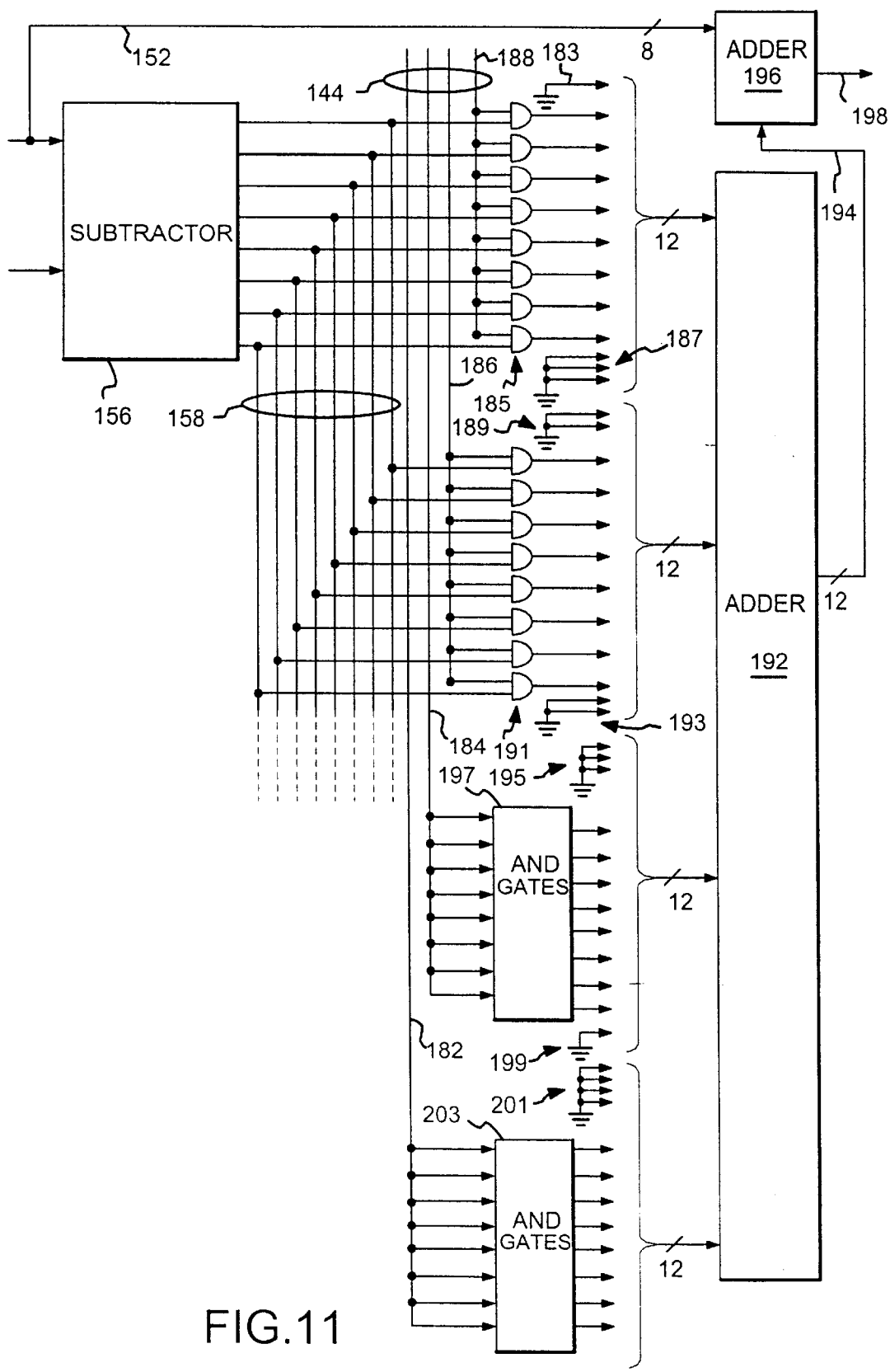
FIG. 11 illustrates an implementation of the embodiment of FIG. 10.

FIG. 11 is a more detailed schematic diagram of the embodiment illustrated in FIG. 10. As shown in FIG. 11, subtractor 156 generates an eight bit binary difference correction signal 158 that is applied to a series of AND gates 185, 191, 197 and 203. The binary fractional address signal 144 is also applied to these same AND gates in the manner illustrated. The most significant bit 188 of the binary fractional address signal 144 is applied to AND gates 185 together with the eight bit binary difference correction signal 158. When a signal exists on 188, the eight bit binary difference correction signal 158 is transmitted to form an output 12 bit signal that is applied to adder 192. The 12 bit output signal includes the eight bits of the binary difference correction signal 158 as well as a bit provided by input 183 and three bits provided by input 187. As shown, the 12 bit signal includes the eight bit binary difference correction signal that has been shifted by one decimal position from the most significant bit position by input 183. The remaining three additional bits 187 are attached as the three least significant bits. As a result, the 12 bit output signal appears as a 12 bit difference correction signal that has been divided by two (shifted by one decimal position in binary format). Similarly, the eight bit binary signal is input to AND gates 191 is shifted by two decimal positions as indicated by inputs 189. The output 12 bit binary signal thus appears as a 12 bit difference correction signal that has been divided by four or multiplied by one-fourth using binary fractional multiplication. Similarly, inputs 195 shift the eight bit binary signal by three decimal locations to form a 12 bit binary signal that appears as a difference correction signal that has been divided by eight. Finally, inputs 201 shift the eight bit binary signal to form a 12 bit binary difference correction signal that has been divided by 16. These quotient values are then added in adder 192 to generate an incremental correction signal 194 that is applied to adder 196. Adder 196 adds the correction value at address A on line 152 to generate an output 198 that constitutes a zone correction signal.

Figure 12:
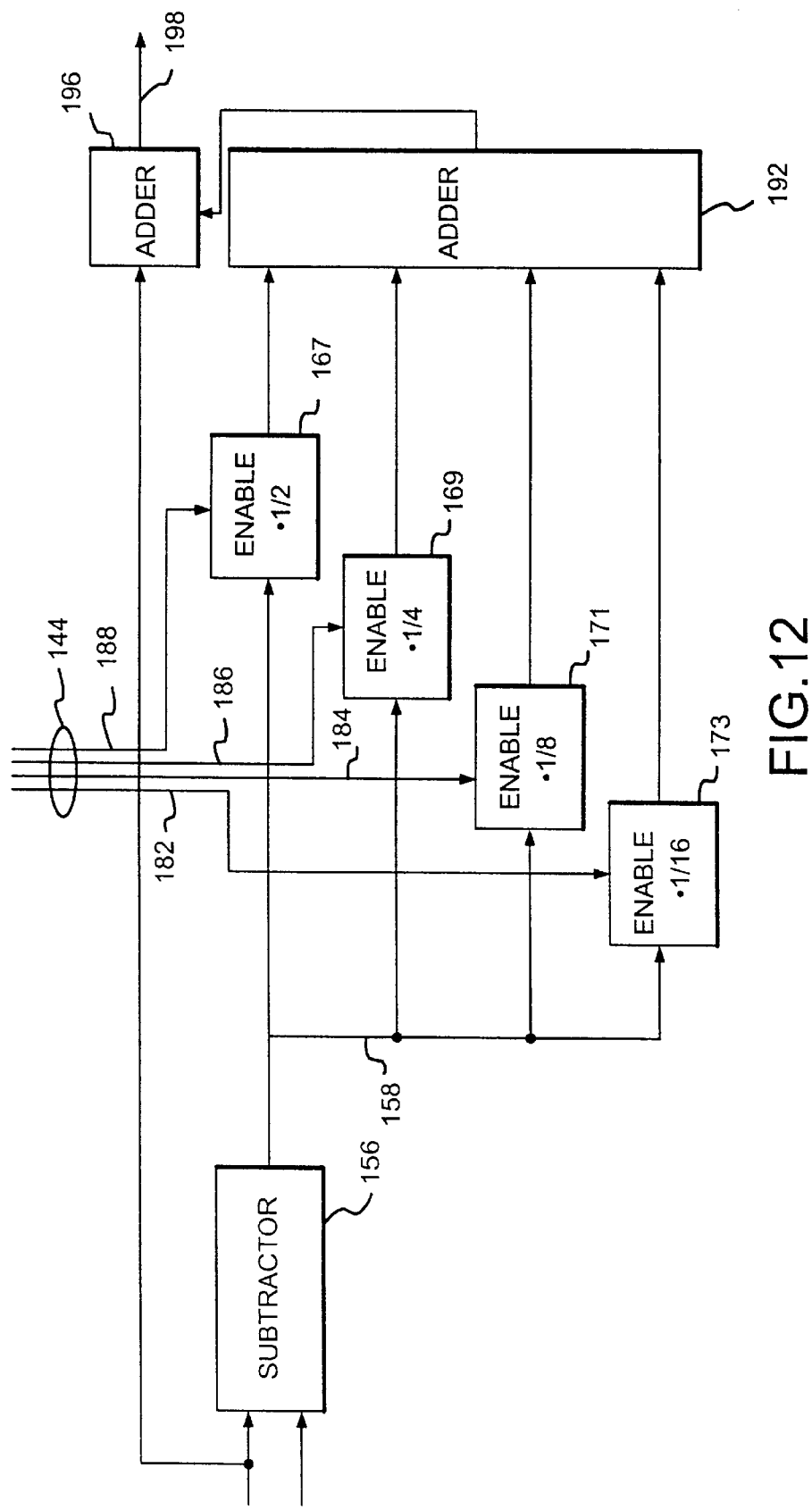
FIG. 12 is a block diagram generically illustrating another embodiment of the high speed binary dividers.

FIG. 12 is a schematic illustration of another alternative embodiment. As shown, subtractor 156 generates a difference correction signal 158 that is applied to a series of binary fractional multipliers 167, 169, 171 and 173. The binary fractional address signal 144 is applied to the binary fractional multipliers to enable their operation. For example, the most significant bit 188 is applied to binary fractional multiplier 167, while the next to the most significant bit 186 is applied to binary fractional multiplier 169. The next to the least significant bit 184 is applied to binary fractional multiplier 171, while the least significant bit 182, of the binary fractional address 144, is applied to binary fractional multiplier 173. The enabled quotient values are then added in adder 192. The incremental correction signal at the output of adder 192 is added to the group correction value in adder 196 to generate a zone correction value 198.

Figure 13:
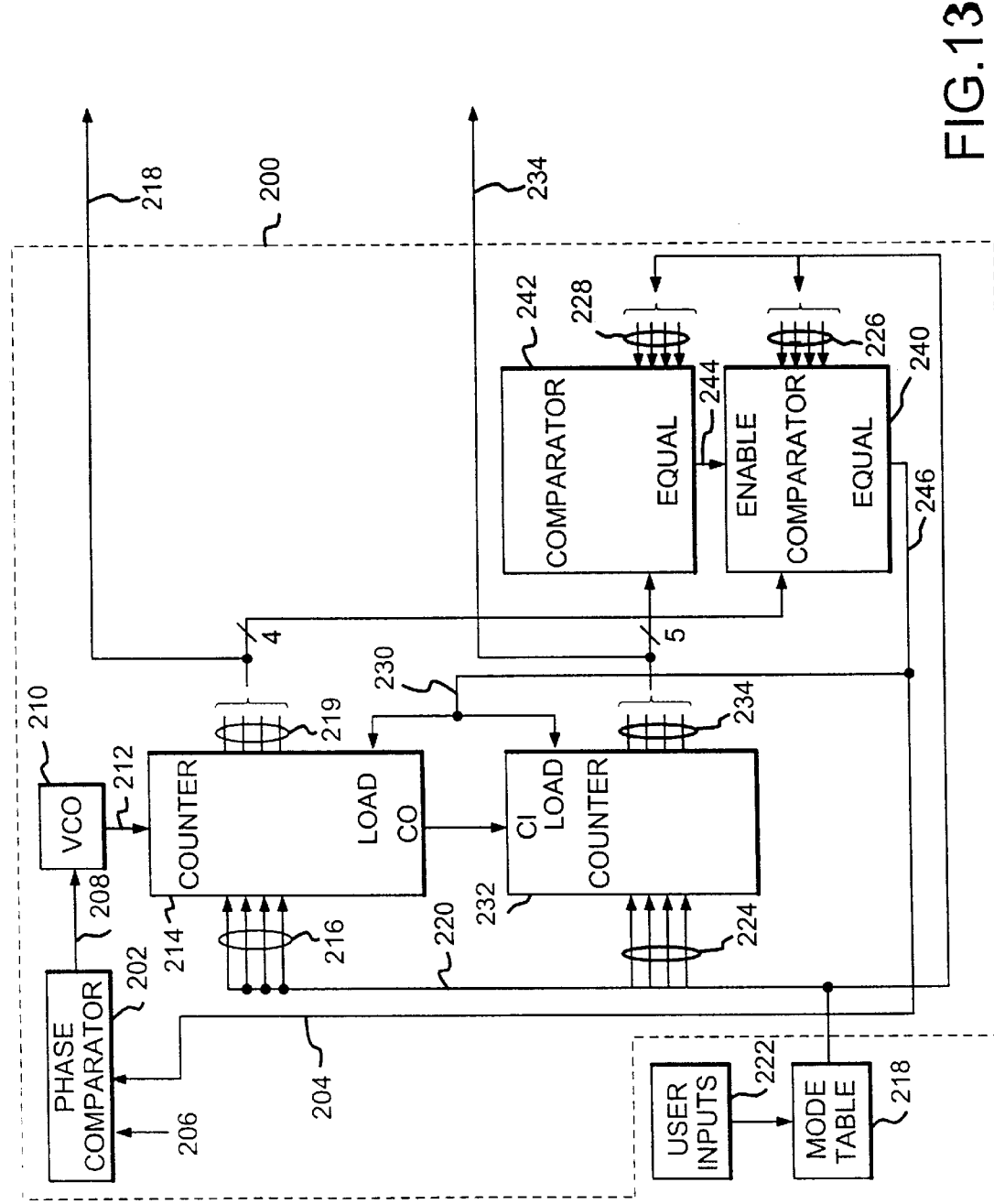
FIG. 13 is a detailed schematic block diagram of one embodiment of an address generator of the present invention.

FIG. 13 is a schematic block diagram of an alternative configuration for an address generator 200. As shown in FIG. 9, phase comparator 202 compares phase correction signal 204 with a vertical sync signal, a horizontal sync signal, or a pixel clock 206 or some multiple thereof, and generates a phase difference signal 208 indicative of the phase difference between phase correction signal 204 and vertical or horizontal sync signal 206. In general, the vertical sync signal and horizontal sync signal 206 is used for generating zone correction values in the vertical direction, while the pixel clock signal 206 is used for generating zone correction values in the horizontal direction. The phase difference signal 208 is applied to a voltage controlled oscillator 210 that alters the frequency of the clock signal 212 in accordance with the magnitude of the phase difference signal 208. The clock signal 212 produces a clock output for each physical division in the manner described with respect to FIG. 8. In other words, as the display screen is scanned by the raster scanned display, a clock pulse is generated synchronously as the scan reaches each physical division. The clock 212 is applied to counter 214 that counts each of the clock pulses 212. Counter 214 is similar to counter 138 of FIG. 8, with the exception that an initial binary fractional address 216 is provided from a mode table 218 by connectors 220. The mode table 218 is produced from user inputs 222. Connectors 220 can comprise a series of hardwired connectors or a bus that is connected to a microprocessor for directing the information on the bus to the appropriate location. Mode table 218 additionally provides an initial group address 224, a binary fractional end address 226 and a group end address 228. When a counter load signal 230 is generated, the counter is loaded with the initial binary fractional address 216. The subsequent clock signals 212 are added to the initial binary fractional address count 216 to generate the binary fractional address 219. Referring to FIG. 4, the initial binary fractional address 46, which comprises physical division 48, is the tenth physical division that can be generated as the first count of the binary fractional address 219 of FIG. 9.

As also disclosed in FIG. 9, counter load signal 230 also loads counter 232 with the initial group address 224, which corresponds to the initial group address 44 illustrated in FIG. 4. Hence, the group address 234 generated at the output of counter 232 starts counting at the initial group address and continues to count subsequent group addresses. The group address 234 is applied to the memory and to the adder which adds one to the address of the group, as illustrated in FIGS. 7 and 8. Similarly, the binary fractional address 219 is applied to the logic devices 164 (FIG. 8).

As further illustrated in FIG. 13, the binary fractional address 218 is applied to comparator 240. Group address signal 234 is applied to comparator 240 which compares the group address 234 to the group end address 228. When the group address 234 and the group end address 228 are equal, a signal is generated at output 244 which enables the comparator 240. Comparator 240 then compares the binary fractional address 219 to the binary fractional end address 226. When these are equal, a signal is generated at output 24 which is used as a counter load signal 230 and a phase correction signal 204. Output 246 indicates the end of the video image has been reached. In this manner, binary fractional addresses 219 and group addresses 234 are generated only for the physical divisions that are specifically aligned with the video image that is present on the screen 12.

Figure 14:
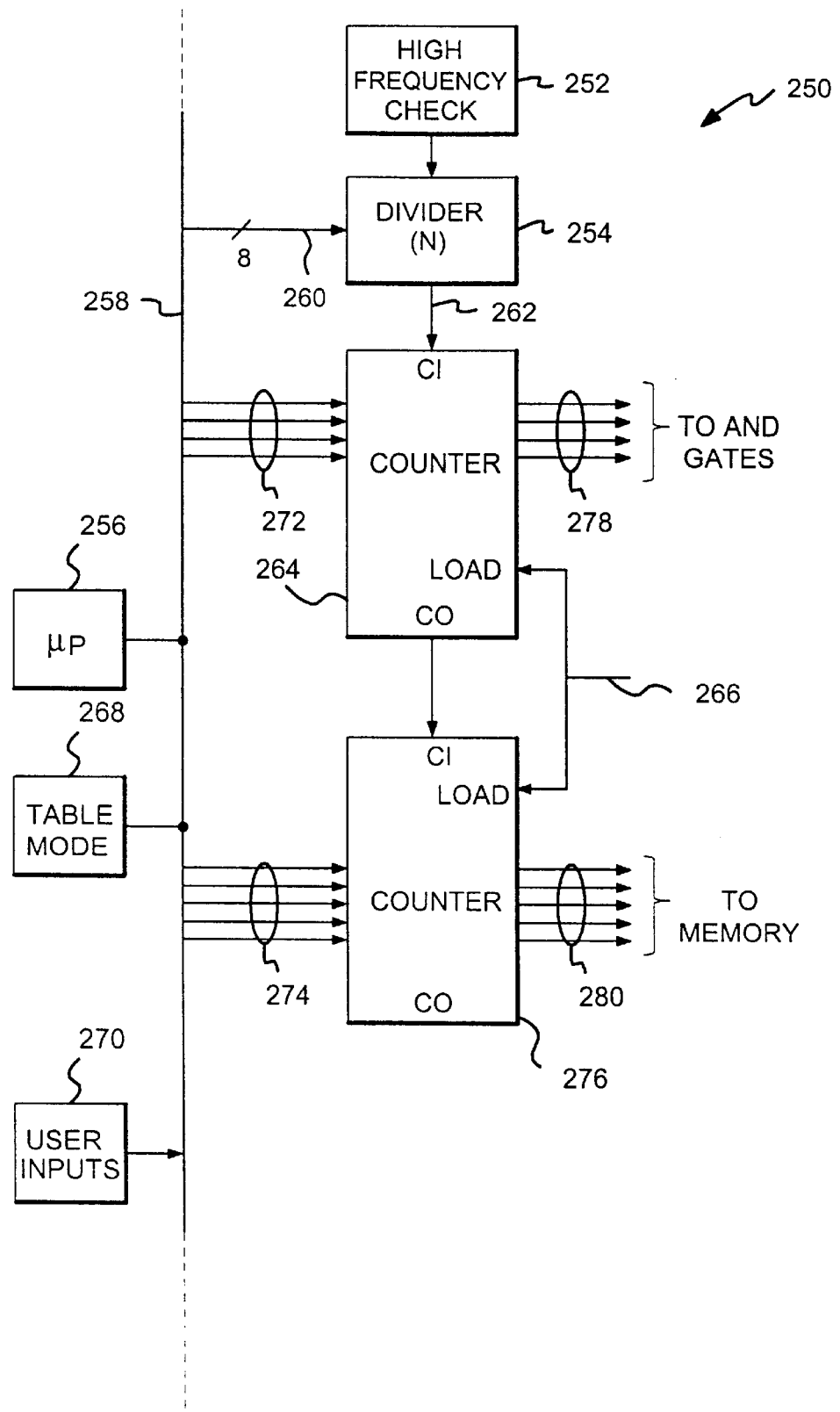
FIG. 14 is a schematic block diagram of another embodiment of an address generator.

FIG. 14 is a schematic diagram illustrating an additional implementation of an address generator 250. As shown in FIG. 14, a high-frequency clock 252, such as pixel clock 100 (FIG. 7), generates a high-frequency clock signal that is applied to divider 254. Divider 254 divides the high-frequency clock signal by an eight bit number that is generated by microprocessor 256 and applied to divider 254 by bus 258. The eight bit number 260 is selected so that the high-frequency clock signal is divided to produce a clock signal 262 for each physical division. In other words, the high-frequency clock 252 generates a clock signal that has a high enough frequency and the eight bit number is sufficiently large that a clock signal 262 can be generated with a reasonable degree of accuracy to match a number of physical divisions selected between each group. The clock signal 262 is then applied to a counter 264. Counter 264 is initially loaded by a load signal 266 which may comprise a vertical sync signal, a horizontal sync signal, a pixel clock signal or some multiple thereof. The load signal 266 loads the initial binary fractional address into the counter 264. The initial binary fractional address 272 is produced from the mode table 268 and applied to the counter 264 by microprocessor 256 via bus 258. User inputs 270 are used by microprocessor 256 to generate the load table 268. Microprocessor 256 also loads the initial group address 274 into counter 276. Load signal 266 causes the initial group address 274, available from bus 258, to be loaded into counter 276. The binary fractional address signal 278 is applied to the AND gates, while the group address signal 280 is applied to memory in a manner similar to that disclosed in FIG. 13. Of course, multiple dividers, such as divider 255, can be used to generate multiple binary fractional addresses for multiple correction factor parameters.

Figure 15:
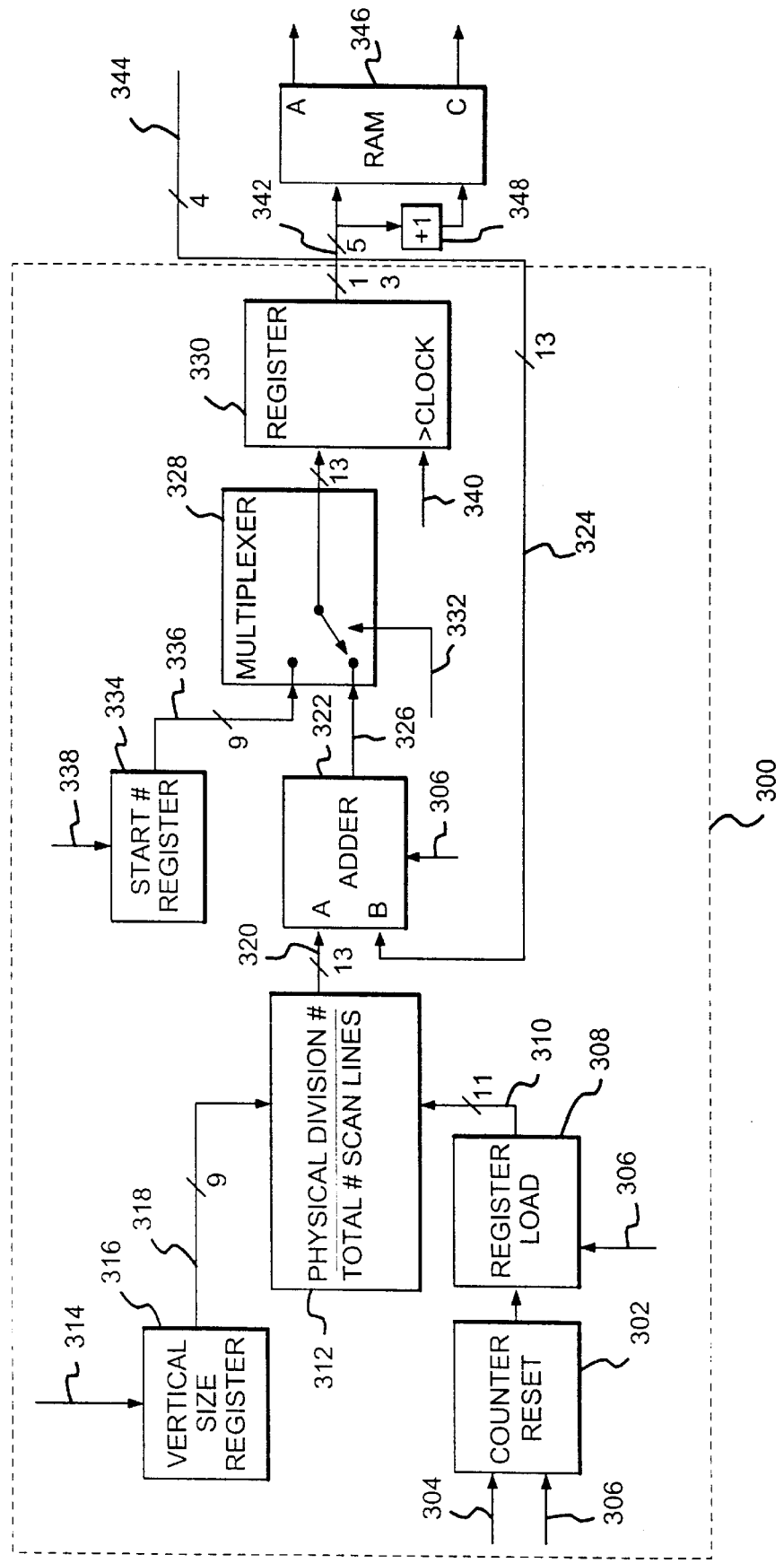
FIG. 15 is a schematic diagram of still another embodiment of an address generator.

FIG. 15 is a schematic illustration of still another address generator 300. Address generator 300 is illustrated as an address generator for generating vertical zone correction values. Address generator 300, in FIG. 15, includes a counter 302 that counts horizontal sync signals 304. The horizontal sync signals are generated at the end of each video scan line. Vertical sync signal 306 loads register 308 with the count of counter 302 so that the register generates an output 310 equal to the number of video scan lines in a video image. The counter 302 is reset for each vertical sync signal 306. The output 310 is applied to a divider 312. Vertical size register 316 stores the physical division number which is provided by the mode table input 314 in a manner similar to that described above. The physical division number is the total number of physical divisions over the portion of the screen on which the image appears, or that portion for which image alignment is desired. This can be determined by a microprocessor in response to user inputs. This physical division number 318 is also applied to divider 312. Divider 312 divides the physical division number by the total number of scan lines in a video image to produce an address quotient value 320. The address quotient value is representative of the number of physical segments per scan line. The address quotient value 320 may comprise a non-integer number that may be less than one. Any binary remainder values that exist as a result of the division are included, or at least partially included (rounded off) as least significant bits in the address quotient value 320. In this manner, the address quotient value may include a large number of bits, e.g., 13 bits. The address quotient value 320 only needs to be generated when the parameters of the video image are changed. For example, when the horizontal or vertical size or centering of the video image is changed, or the operating frequency of the monitor is changed, the address quotient value 320 must be recalculated. Hence, divider 312 need not operate at a high rate of speed. For this reason, the divider 312 may be implemented in computer program code. Of course, many of the functions described herein may also be implemented in computer program code.

As also shown in FIG. 15, the address quotient value 320 is applied to adder 322 and added to the differential address signal 324. Adder 322 is reset for each vertical sync signal 306. The output 326 of adder 322 is applied to multiplexer 328 that applies the output 326 to register 330 as long as a vertical sync signal 332 is not present. When vertical sync signal 332 is present, multiplexer 328 switches to start register 334 that applies start number 336 to register 330. Start number register 334 stores the start number 336 in response to mode table input 338. In this manner, the register 330 initially stores the start number 336 at the beginning of the vertical sync signal. After that, the address quotient value is added to the start number to produce the differential address 324. Horizontal sync signal 340 is applied to register 330 to clock the value stored in register 330 to output 324. The differential address 324 is applied to adder 332 which adds the address quotient value to the differential address for each complete vertical scan before it is reset. Also, the start number 336 is added to the address quotient value 320 so that the start address is correct. The differential address signal 324 is a binary signal that, in the present example, has thirteen bits. These thirteen lines are divided into a group address 342, which is the five most significant bits, and an interpolation address 344 which is the next four most significant bits. The group address signal 342 is applied to the RAM memory 346 and the adder 348, in the same manner as described above.

Figure 16:
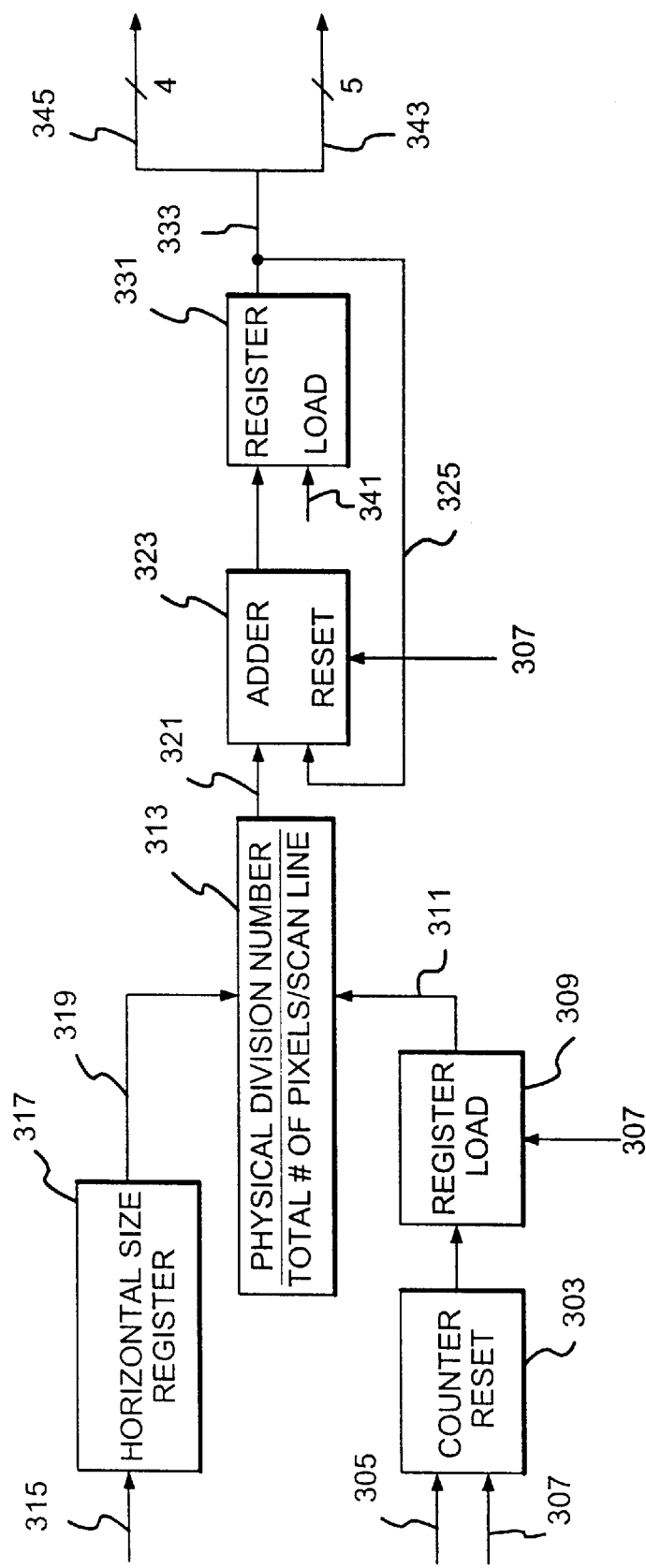
FIG. 16 is a schematic block diagram of another embodiment of an address generator.

FIG. 16 is a schematic block diagram illustrating the manner in which the embodiment of FIG. 16 can be implemented for corrections in the horizontal direction. As shown in FIG. 16, a counter 303 counts pixel clock signals 305 until the counter is reset by horizontal sync input 307. The output of counter 303 is a count representative of the number of pixels per line. This count is applied to register 309 which is loaded for each horizontal sync signal 307. Register 309 applies the total number of pixels per scan line to the divider 313. Mode table input 315 inputs a physical division number into the horizontal size register 317. The physical division number is a number that is indicative of the number of physical divisions that have been established across an entire horizontal line. The physical division number 319 is also applied to divider 313. Divider 313 generates an address quotient value 321 which is representative of the number of physical divisions divided by the total number of pixels per scan line. The address quotient value 321 is applied to adder 323 which adds the address quotient value to the differential address 325. The differential address 325 represents the addition of all the previous address quotient values for the horizontal line. Adder 323 is reset by the H sync signal 307 so that the zone address is reset for each horizontal line. The output of the adder 323 is applied to the register 331. The value of adder 323 is loaded into the register for each pixel clock 341. In this manner, the differential address 325 and the address quotient value 321 are added for each pixel clock signal. The output of the register 331 is a zone address 333 in which the four lower significant bits comprise a binary fractional address 345 and the five most significant bits comprise a group address 343. Of course, the number of bits that form each of the addresses can be selected as desired by the user. Although a pixel clock signal has been used for loading the register 331, any desired clock signal can be used. For example, various address generators have been disclosed for generating clock signals that correspond to desired physical segments that can be established between group addresses. These techniques can be used to generate clock signals that do not correspond to the pixels or pixel clock. Also, although the embodiment of FIG. 16 does not show the start register and other features of FIG. 15, these features may also be included in the embodiment of FIG. 16.

Figure 17:
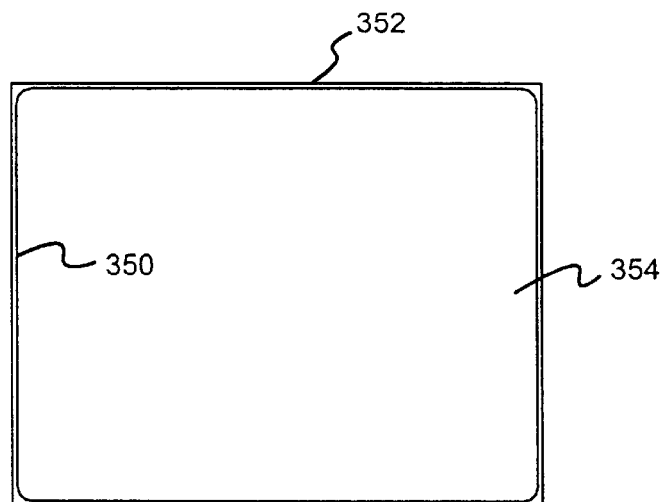
FIG. 17 is a schematic diagram of a screen showing a raster and bezel.

FIG. 17 is a schematic illustration of a raster 350 that occupies the maximum space within a bezel 352 on screen 354. Raster 350 has been enlarged to fit within the maximum confines of the bezel 352 so that raster 350 occupies the maximum allowable viewable space on screen 354.

Figure 18:
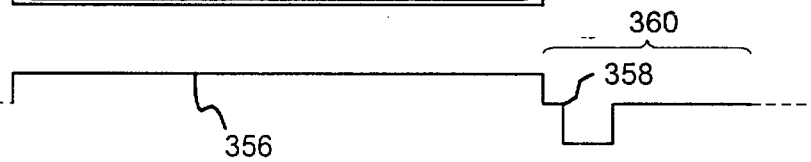
FIG. 18 is a graph of the signal levels showing a raster signal, horizontal sync signal, and retrace signal.

FIG. 18 is a graph illustrating the timing of the trace signal 356, the horizontal sync signal having leading edge 358 and the retrace time 360. The timing graph of FIG. 13 is aligned with the physical dimensions of the raster 350 of FIG. 12. As shown, the trace signal 356 is high for the entire width of the screen 354 between the sides of bezel 352. At the right edge of the bezel 352, the trace signal 356 returns to zero. At a subsequent time, a horizontal sync signal is generated having a leading edge 358. The horizontal sync signal lasts for a predetermined time and then returns to zero for the remaining portion of the retrace 360. At that point, the timing diagram illustrated in FIG. 13 returns to the left edge of bezel 352 where the raster 356 is indicated as returning to a positive voltage.

Figure 19:
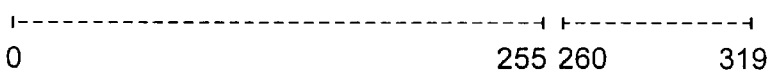
FIG. 19 illustrates address locations for the example of FIGS. 17 and 18.
Figure 23:
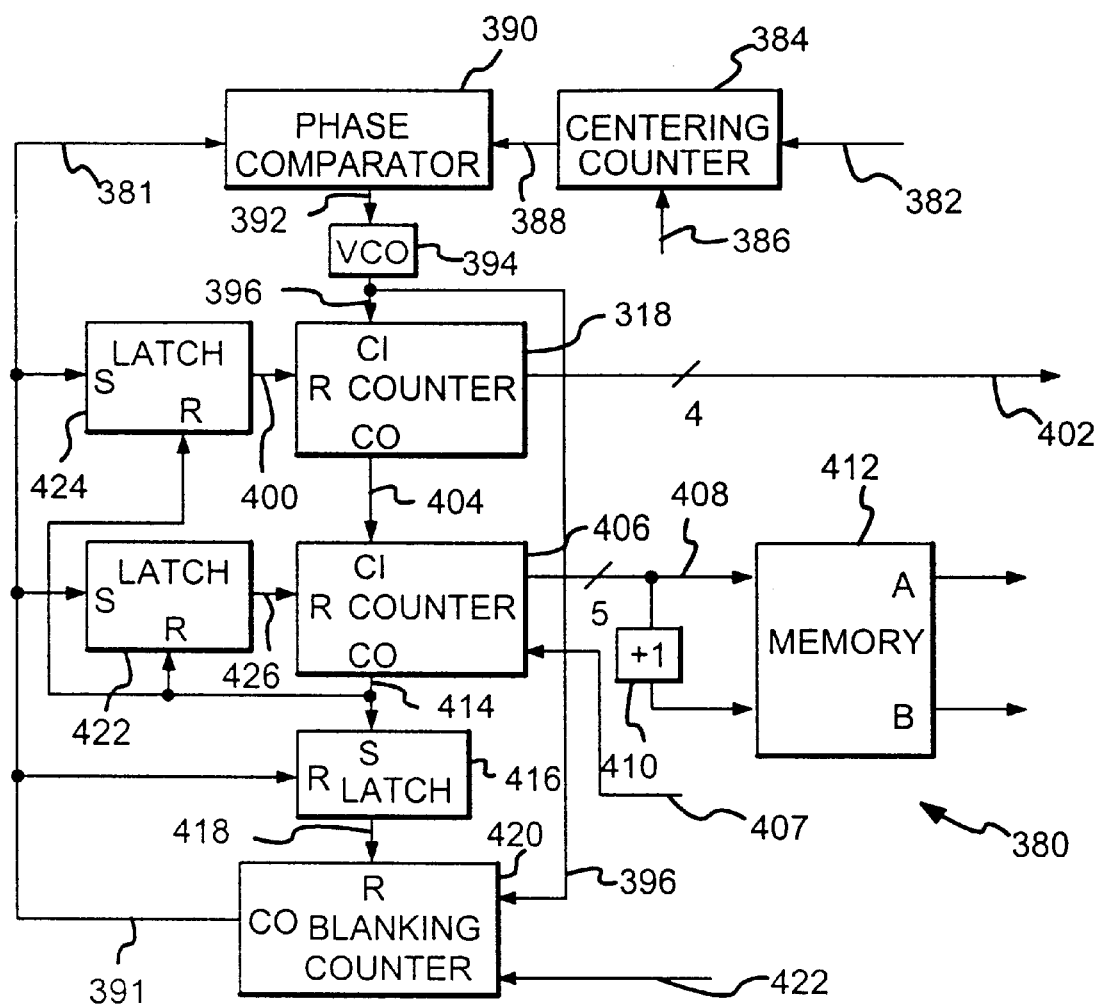
FIG. 23 is a schematic block diagram of a horizontal address generator.
Figure 24:
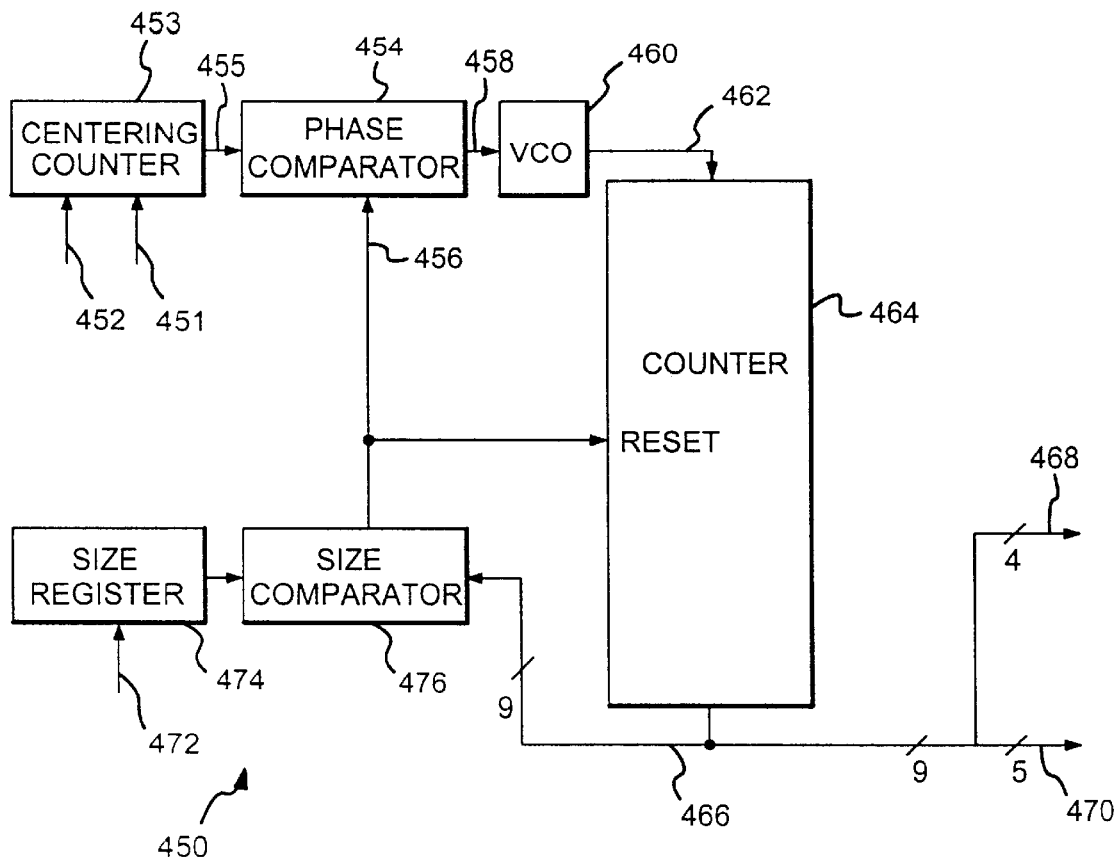
FIG. 24 is a schematic diagram of another horizontal address generator.

FIG. 19 illustrates typical clocking pulses that may be generated in accordance with the devices illustrated in FIGS. 23 and 24, for the example shown in FIGS. 17 and 18. At the left edge of the bezel 352 a counter initiates a count at zero. This count continues until beam trace reaches the right side of bezel 352. At that point, the count reaches 255 in the counter. At a later point in time, the leading edge of 358 of the horizontal sync signal occurs which is at a count of 260. The end of the retrace occurs which is at a count of 319. Again, these are only examples of values that may be encountered in a typical example such as shown in FIGS. 17, 18 and 19.

Figure 20:
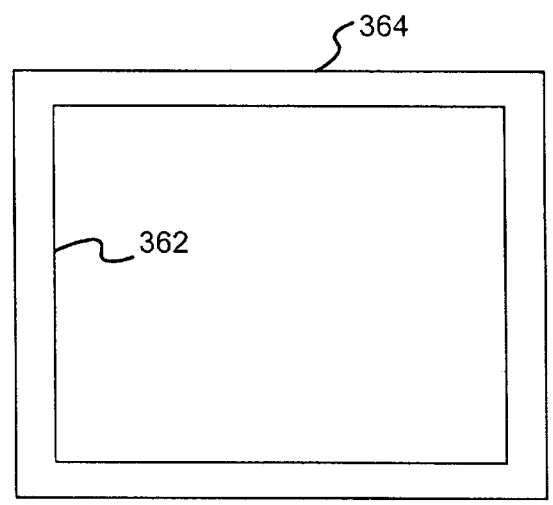
FIG. 20 is a schematic diagram of a screen having a reduced raster in a bezel.

FIG. 20 illustrates an example of a raster that is reduced in horizontal width within the bezel 364. User controls 18, such as illustrated in FIGS. 1 and 2, can be used to modify the size of the raster 362. Raster 362 does not occupy the entire space within bezel 364, as shown in FIG. 20.

Figure 21:
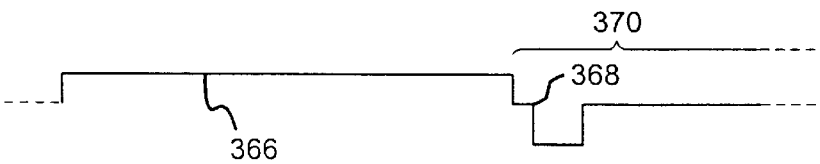
FIG. 21 is a graph of the signal levels showing a raster signal, a horizontal sync signal and a retrace signal.

FIG. 21 is a timing diagram that illustrates the timing of various signals. As shown in FIG. 21, a trace signal 366 is aligned with the raster 362 of FIG. 21. After the trace signal returns to zero, the leading edge 368 of the horizontal sync signal occurs. The horizontal sync signal remains at a specific value for a predetermined period and then returns to zero and remains at zero until the end of the retrace period 370.

Figure 22:
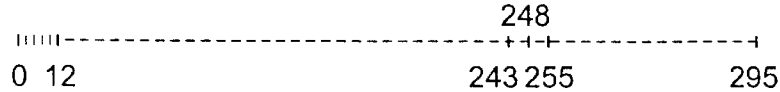
FIG. 22 illustrates address locations for the example of FIGS. 20 and 21.

FIG. 22 illustrates the clocking pulses that may be generated in accordance with the devices shown in FIGS. 20 and 21. As shown in FIG. 22, a zero count is initiated at the left edge of the bezel 364. The beginning of the raster signal 366 occurs at a count of 12. The end of the raster occurs at a count of 243. The leading edge 368 of the horizontal sync signal occurs at a count of 248, while the right edge of bezel 364 occurs at a count of 255. The end of the retrace 370 occurs at a count of 295.

As shown in the examples of FIGS. 17 through 19 and 20 through 22, when the raster is reduced in horizontal size, the total count value, i.e. 295 in FIG. 22, is reduced from the total count value of 319, illustrated in FIG. 19. Additionally, the count that occurs during the raster is reduced to 243–12=231 in FIG. 22. Similarly, the retrace 370 is reduced to 295–243=52, whereas the count during the retrace time as shown in FIGS. 18 and 19 was 319–255=64. The manner in which the raster 362 of FIG. 20 is reduced from the size of raster 350 of FIG. 17 is more fully explained with reference to FIGS. 23 and 24.

FIG. 23 is a schematic block diagram of one implementation of an address generator 380 that generates addresses in the horizontal direction. As shown in FIG. 18, horizontal sync signal 382 is applied to the reset of a centering counter 384. Centering counter 384 is loaded with a programmable count 386. The programmable count 386 is a number that is proportional to the phase delay that is desired for the horizontal sync signal 382. The larger the programmable count 386, the longer the delay. When the centering counter reaches the programmable count number 386 that has been loaded into centering counter 384, a carry-out signal 388 is generated which is applied to the phase comparator 390. The carry-out signal 388 has the same frequency as the horizontal sync signal 382, but is merely delayed in phase by the magnitude of the programmable count 386.

As shown in FIG. 23, the phase comparator 390 compares the phase delayed horizontal sync signal 388 with a phase correction signal 391 and generates a phase difference signal 392 that has a magnitude that is proportional to the phase difference between the phase correction signal 391 and the phase delayed horizontal sync signal 388. The phase difference signal 392 is applied to a voltage controlled oscillator 394 which alters the frequency of the clock signal 396 in order to reduce the phase difference signal 392 to zero. The clock signal 396 is applied to counter 398 which counts the clock pulses when counter 398 has been reset and enabled by reset and enable input 400. Counter 398 is similar to counter 138 of FIG. 8 in that it generates a binary fractional address 402. In the example shown, counter 398 has four output lines so that it can generate a parallel binary signal that is capable of counting to a value of 16. When counter 398 reaches a value of 16 it generates a carry-out signal 404 which is applied to the input of counter 406. Counter 406 counts each of the carry-out signals 404 and generates a group address 408. Counter 406 is similar to counter 142 of FIG. 8. The group address 408, in this case, has five parallel binary output signals so that it can produce counts up to a value of 32.

The group address is then applied to adder 410 and memory 412, as also shown in FIG. 23. Once the value of 32 has been reached, a carry-out signal 414 is generated by counter 406. The carry-out signal 414 is applied to the input of latch 416 which causes latch 416 to latch. In addition, the carry-out signal 414 is applied to the reset inputs of latch 422 and latch 424. This causes latches 422 and 424 to be reset to zero. When set, latch 416 produces an output signal 418 that is applied to the reset and enable input of blanking counter 420. The latching signal 418 causes the blanking counter to reset to zero and begin counting the clock pulses 396. Blanking counter 420 continues to count up to a value equal to the programmable count 422 that is loaded into the blanking counter 420. The programmable count that is loaded into the blanking counter comprises the number of counts that are included in the retrace period 360 of FIG. 18 and the retrace period 370 of FIG. 21. In other words, the programmable count 422 for the example shown in FIGS. 17 through 19 is equal to 319–255=64. For the example shown in FIGS. 20 through 22, the programmable count loaded into the blanking counter is equal to 295–243=52. Counter 406 is also loaded with a programmable count 407 that is equal to the number of groups within the time that the raster signal is positive, as shown in FIG. 18 and FIG. 21.

As additionally shown in FIG. 23, the blanking counter produces a carry-out signal 391 when the programmable count 422 has been reached. This carry-out signal 391 comprises the phase correction signal that is applied to phase comparator 390. The carry-out signal 391 is also applied to the "set" inputs to latches 422 and 424 which cause latches 422 and 424 to generate a latched output on outputs 426 and 400, respectively, that are applied to the "reset" inputs of counters 406 and 398, respectively. These signals reset counters 398 and 406 to zero and enable the counters so they can begin the counting sequence again.

FIG. 24 discloses another address generator for generating addresses in the horizontal direction that is similar to the horizontal address generator of FIG. 23. As shown in FIG. 24, horizontal address generator 450 includes a phase comparator 454 that compares the phases of a time delayed horizontal sync signal 455 and a phase correction signal 456 to produce a phase difference signal 458. H-sync signal 452 is applied to a centering counter 453. A phase count signal 451 is loaded into the centering counter 453 which functions to delay the centering counter 453 by a predetermined amount that is proportional to the phase count 451. When the centering counter 453 has reached the phase count number 451, it generates the time-delayed H-sync signal 455 that is applied to the phase comparator 454. In this manner, the phase count signal 451 can delay the application of the H-sync signal to the phase comparator 454 and therefore shift the location of the raster on the bezel. The phase difference signal 458 is then applied to a voltage controlled oscillator 460 that generates a clock pulse 462 that is applied to counter 464. Counter 464 generates an output count 466 on nine parallel lines. The four least significant bits comprise a binary fractional address 468, while the five most significant bits comprise the group address 470. Of course, the counter can be configured to count up to any number of bits and the output can be divided in any desired fashion to provide the desired resolution.

As also shown in FIG. 24, a size count 472 is applied to size register 474. The size count in the example of FIGS. 17 through 19 comprises a value of 319. In the example of FIGS. 20 through 22, the size count is equal to a value of 295. Size register 474 stores the size count and applies the size count to size comparator 476. Size comparator 476 compares the size count number 472 with the output count 466. When these values are equal, an output signal 456 is generated and applied to the reset of counter 464. Counter 464 is then reset to zero and starts counting the clock pulses 462 from zero. In this manner, the counter 464 counts the number of size count signal. The output 456 from the size comparator comprises the phase correction signal that is applied to the phase comparator 454 for comparison with the time delayed H-sync signal 455.

The present invention therefore provides a unique manner of physically dividing a display screen into a plurality of physical divisions that have specific physical locations on the screen. Since the group correction values are generated for specific physical locations, zone correction values can also be generated for specific physical locations. By addressing specific zone addresses that correspond to the location of the image on the screen, entirely new correction values do not have to be produced or retrieved from storage each time the horizontal and vertical size and centering of the video image is changed. Moreover, the present invention uses a high-speed binary fractional multiplier that allows for the generation of incremental correction values as they are needed in both horizontal and vertical directions. This is accomplished by a unique method of selecting a binary fractional number that utilizes a binary order of magnitude number in a binary fractional multiplier so quotient values can be generated by that merely shifting the decimal location of the difference correction value. In this manner, incremental correction values can be generated without the need for expensive and comparatively slow digital signal processors or microprocessors which have been incapable of producing such incremental correction values as they are needed.

The foregoing description of the invention has been presented for purposes of illustration and description. It is not intended to be exhaustive or to limit the invention to the precise form disclosed, and other modifications and variations may be possible in light of the above teachings. Various parts of the present invention may be implemented in software, while other portions may implemented in hardware. Particular implementations are strictly left to the choice of the particular designer. Additionally, although much of the description has been for a video display device such as a cathode ray tube monitor, any raster scan video type device can utilize the present invention to correct distortion. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating a zone correction value for correcting the alignment of an image at a specified physical location on a screen comprising the steps of:

storing a predetermined number of group correction values for a predetermined number of physical locations on said screen;

retrieving two group correction values from said predetermined number of group correction values for adjacent group addresses that encompass said specified physical location;

generating a difference correction value by determining the difference between said two group correction values;

generating a binary fractional address that corresponds to a physical division that is located proximate to said specified physical location;

multiplying said difference correction value by a plurality of binary fractional numbers to produce a plurality of quotient values;

enabling selected ones of said plurality of quotient values in response to said binary fractional address;

selecting at least one of said plurality of quotient values in response to said binary fractional address to produce enabled quotient values;

adding said enabled quotient values to produce an incremental correction value;

summing said incremental correction value with one of said two group correction values to produce said zone correction value.

2. A method of generating a zone correction value for correcting the alignment of an image at a specified physical location on a screen comprising the steps of:

storing a predetermined number of group correction values for a predetermined number of physical locations on said screen;

retrieving two group correction values from said predetermined number of group correction values for adjacent group addresses that encompass said specified physical location;

generating a difference correction value by determining the difference between said two group correction values;

generating a binary fractional address that corresponds to a physical division that is located proximate to said specified physical location, wherein generating said binary fractional address for vertical geometry corrections comprises the steps of dividing a physical division number by a total number of scan lines of said image to produce an address quotient value and accumulating said address quotient value for each horizontal synchronization signal;

dividing said difference correction value by shifting the decimal position of said difference correction value to produce a plurality of quotient values;

selecting at least one of said plurality of quotient values in response to said binary fractional address to produce enabled quotient values;

adding said enabled quotient values to produce an incremental correction value;

summing said incremental correction value with one of said two group correction values to produce said zone correction value:

generating a start number; and adding said start number to said address quotient value.

3. A method of generating a zone correction value for correcting the alignment of an image at a specified physical location on a screen comprising the steps of:

storing a predetermined number of group correction values for a predetermined number of physical locations on said screen;

retrieving two group correction values from said predetermined number of group correction values for adjacent group addresses that encompass said specified physical location;

generating a difference correction value by determining the difference between said two group correction values;

generating a binary fractional address that corresponds to a physical division that is located proximate to said specified physical location, wherein generating said binary fractional address for horizontal geometries comprises the steps of dividing a physical division number by a total number of pixels on each scan line of said image to produce an address quotient value and accumulating said address quotient value for each pixel clock signal;

dividing said difference correction value by shifting the decimal position of said difference correction value to produce a plurality of quotient values;

selecting at least one of said plurality of quotient values in response to said binary fractional address to produce enabled quotient values;

adding said enabled quotient values to produce an incremental correction value;

summing said incremental correction value with one of said two group correction values to produce said zone correction value;

generating a start number; and adding said start number to said address quotient value.

4. A system for generating zone correction values for correcting the alignment of a display device comprising:

an address generator that produces sequential binary fractional addresses and sequential group addresses;

a memory coupled to said address generator that stores group correction values corresponding to said sequential group addresses and produces sequential group correction values in response to said sequential group addresses;

a subtractor coupled to said memory that produces a difference correction value by determining the difference between two adjacent group correction values of said sequential group correction values;

a series of parallel binary fractional multipliers coupled to said subtractor that generates a plurality of quotient values in response to said sequential binary fractional addresses to produce sequential incremental correction values;

an adder that generates said zone correction values by adding said incremental correction values to said sequential group correction values.

5. The system of claim 4 wherein said series of parallel binary fractional multipliers comprises:

enabling logic connected in parallel that shifts the decimal position of said difference correction value by a plurality of different decimal positions to produce said plurality of quotient values that are enabled in response to said binary fractional addresses;

an adder coupled to said plurality of dividers that adds said plurality of quotient values to produce said incremental correction values.

6. The system of claim 4 wherein said series of parallel binary fractional multipliers comprises:

a plurality of parallel binary fractional multipliers that produce said plurality of quotient values by shifting said difference correction value by a sequential series of different decimal positions;

logic devices for enabling certain of said plurality of quotient values in response to said binary fractional address to produce enabled quotient values;

an adder that adds said enabled quotient values to produce said incremental correction values.

7. The system of claim 4 wherein said address generator comprises:

a first counter that generates sequential binary fractional addresses;

a second counter coupled to said first counter that generates sequential group addresses.

8. The system of claim 7 wherein said address generator further comprises:

a processor coupled to said first and second counters that loads an initial binary fractional address in said first counter and an initial group address in said second counter.

9. The system of claim 8 wherein said address generator further comprises:

a first comparator that compares said sequential group addresses with a group end address to produce a comparator enable signal;

a second comparator, connected to receive said comparator enable signal, that compares said binary fractional address with a binary fractional end address.

10. The system of claim 4 wherein said address generator comprises:
- a divider that generates an address quotient value that is representative of a physical division number divided by the number of video scan lines in a video image;
- an adder that accumulates said address quotient values to produce said binary fractional address and said group address.

11. The system of claim 10 further comprising a start number register that provides an initial binary fractional address to said adder.

12. A method of generating zone correction values for a predetermined number of physical divisions on a display screen, said predetermined number of physical divisions being independent of a number of scan lines that are displayed on said display screen comprising the steps of:
- generating zone addresses that are representative of the physical locations of said physical divisions on said display screen;
- using a predetermined number of most significant bits of said zone address as a group address to retrieve a first group correction value and a subsequent group correction value from memory;
- determining the difference between said first group correction value and said subsequent group correction value to produce a difference correction value;
- generating quotient values by shifting the decimal position of said difference correction value by a series of different decimal positions;
- using a predetermined number of least significant bits of said zone address as a binary fractional address to select predetermined quotient values;
- adding said quotient values to produce an incremental correction value;
- summing said incremental correction value with a group correction value to produce said zone correction value.

13. A method of generating zone addresses for use in generating zone correction values that are used for correcting the alignment of a display device comprising the steps of:
- generating a clock signal;
- accumulating said clock signal to produce a binary count signal that has most significant bits and least significant bits;
- utilizing said least significant bits as a binary fractional address;
- utilizing said most significant bits as a group address.

14. A device for generating zone correction values from group values using binary fractional addresses and group addresses comprising:
- a clock that generates clock signals;
- an adder that accumulates said clock signals to produce said zone addresses having most significant bits corresponding to said group addresses and least significant bits corresponding to said binary fractional addresses;
- a subtractor that produces a difference correction value by determining the difference between group values at adjacent group addresses;
- a plurality of multipliers that generate quotient values by multiplying said difference correction value by a plurality of sequential binary fractional numbers
- logic circuitry that utilizes said binary fractional addresses to enable said multipliers.

15. The device of claim 14 further comprising memory that stores said group values that are addressed by said most significant bits.

16. A high-speed binary multiplier for generating incremental correction values from stored group correction values to precisely align a raster to a physical location on a display screen comprising:
- a plurality of binary fractional multipliers that are connected in parallel that shift the decimal position of a correction value by a plurality of different decimal positions to produce a plurality of quotient values;
- logic circuitry coupled to said plurality of binary fractional multipliers that selects predetermined quotient values;
- an adder that adds said quotient values selected by said logic circuitry.

\* \* \* \* \*